(12) United States Patent
Van Drieenhuizen et al.

(10) Patent No.: US 7,209,274 B2
(45) Date of Patent: Apr. 24, 2007

(54) HIGH FILL-FACTOR BULK SILICON MIRRORS

(75) Inventors: Bert P. Van Drieenhuizen, Fremont, CA (US); Joseph E. Davis, Morgan Hill, CA (US)

(73) Assignee: Capella Photonics, Inc., San Jose, CA (US)

( * ) Notice: Subject to any disclaimer, the term of this patent is extended or adjusted under 35 U.S.C. 154(b) by 182 days.

(21) Appl. No.: 10/751,034

(22) Filed: Dec. 31, 2003

(65) Prior Publication Data

US 2004/0160687 A1    Aug. 19, 2004

Related U.S. Application Data

(63) Continuation-in-part of application No. 10/159,153, filed on May 31, 2002, now Pat. No. 6,695,457.

(60) Provisional application No. 60/295,682, filed on Jun. 2, 2001.

(51) Int. Cl.
*G02B 26/08* (2006.01)
(52) U.S. Cl. .................................... 359/224
(58) Field of Classification Search ................ 359/198, 359/199, 223, 224, 225, 290
See application file for complete search history.

(56) References Cited

U.S. PATENT DOCUMENTS

| | | | |
|---|---|---|---|
| 4,360,182 A | 11/1982 | Titus | |
| 5,239,361 A | 8/1993 | Burch | |
| 5,497,262 A * | 3/1996 | Kaeriyama | .................. 359/223 |

(Continued)

FOREIGN PATENT DOCUMENTS

CN    20000133799    11/2000

(Continued)

OTHER PUBLICATIONS

Supplementary European Search Report dated Dec. 21, 2005 corresponding to the related European Patent Application No. 03756196.6.

(Continued)

*Primary Examiner*—Alessandro Amari
(74) *Attorney, Agent, or Firm*—DLA Piper US LLP

(57) ABSTRACT

A method and apparatus for fabricating a MEMS apparatus having a device layer with an optical surface that is supported by a pedestal on a planar support layer that is suspended for movement with respect to a base support by hinge elements disposed in a different plane from the planar support layer. The surface area of the optical surface is maximized with respect to the base support to optimized the fill factor of the optical surface and afford a high passband. The height of the pedestal is selected to position the device layer sufficiently above the base support to afford an unobstructed predetermined angular rotation about each axis. The hinges may be made of thin-film material, fabricated by way of surface micromachining techniques. The hinges are disposed underneath the device layer enabling the optical surface to be maximized so that the entire surface becomes usable (e.g., for optical beam manipulation). MEMS devices afford an array of MEMS mirrors with a high optical fill factor and high passband. Further, use of both bulk and surface micromachining techniques gives a MEMS device with a large and flat mirror and flexible hinges capable of a substantial rotational range at modest electrostatic drive voltages.

11 Claims, 27 Drawing Sheets

U.S. PATENT DOCUMENTS

| | | |
|---|---|---|
| 5,661,591 A | 8/1997 | Lin |
| 5,696,619 A | 12/1997 | Knipe et al. |
| 5,920,417 A | 7/1999 | Johnson |
| 6,028,689 A | 2/2000 | Michalicek et al. |
| 6,201,629 B1 | 3/2001 | McClelland et al. |
| 6,275,325 B1 | 8/2001 | Sinclair |
| 6,292,600 B1 | 9/2001 | Goldstein et al. |
| 6,480,320 B2 | 11/2002 | Nasiri |
| 6,512,625 B2 * | 1/2003 | Mei et al. .................... 359/290 |
| 6,533,947 B2 | 3/2003 | Nasiri et al. |
| 6,585,383 B2 | 7/2003 | Helkey |
| 6,600,851 B2 | 7/2003 | Aksyuk et al. |
| 6,612,706 B2 | 9/2003 | Helkey |
| 6,934,439 B2 | 8/2005 | Mala et al. |
| 2001/0019445 A1 | 9/2001 | Ueda |
| 2002/0034024 A1 * | 3/2002 | Orcutt et al. ............... 359/846 |
| 2005/0024707 A1 | 2/2005 | Bernstein et al. |

FOREIGN PATENT DOCUMENTS

| | | |
|---|---|---|
| WO | WO 01/94253 A2 | 12/2001 |
| WO | WO 2003/102631 | 12/2003 |

OTHER PUBLICATIONS

Tuantranont, et al., "Bulk-Etched Surface Micromachined And Flip-Chip Integrated Micromirror Array For Infrared Applications"; 2000 IEEE/LEOS International Conference on Optical MEMS, IEEE Catelog #; 00EX399, Sheraton Kauai, Resort, Kauai, Hawaii Aug. 21-24 2000, pp. 71-72.

* cited by examiner

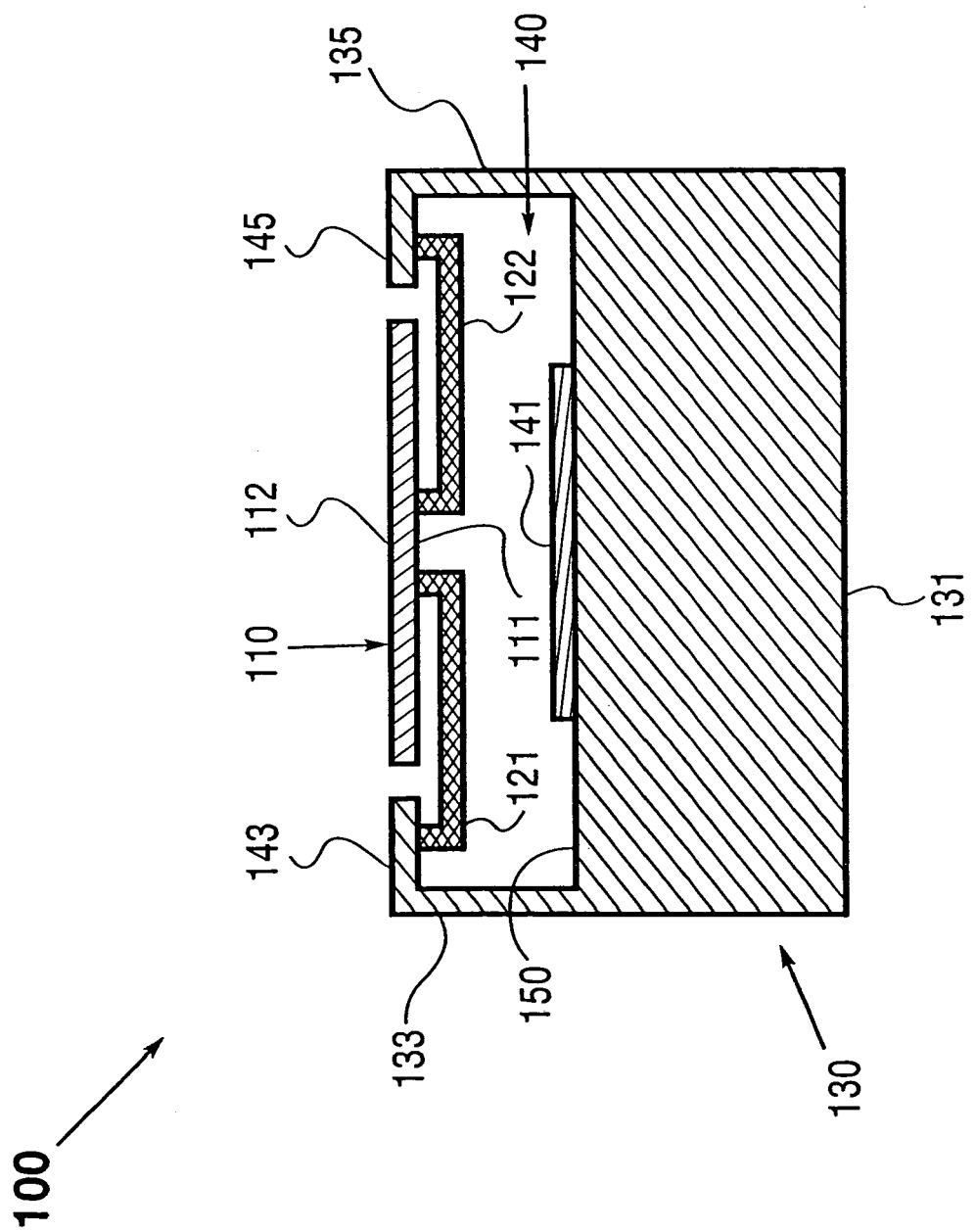

HIGH FILL-FACTOR BULK SILICON MIRRORS

CROSS-REFERENCE TO RELATED APPLICATIONS

This application is a continuation-in-part of application Ser. No. 10/159,153, filed May 31, 2002, now U.S. Pat. No. 6,695,457 which claims the benefit of U.S. Provisional Patent Application No. 60/295,682, filed on 2 Jun. 2001.

BACKGROUND OF THE INVENTION

This invention relates generally to micro-electro-mechanical systems (MEMS), and more particularly to MEMS apparatus and methods for making MEMS apparatus, such as mirrors, as by a combination of bulk and surface micromachining techniques.

MEMS apparatus, such as mirrors, have utility in a variety of optical applications, including high-speed scanning and optical switching. In such applications, it is essential for MEMS mirrors to have flat optical surfaces, large rotational range, and robust performance.

Many of these optical applications, e.g., optical networking applications, further require that MEMS mirrors be configured in a closely packed array. It is desirable in such applications to maximize the "optical fill factor" of the array, e.g., by making the optical surface area of each constituent mirror as large as possible relative to its supporting base area. In known MEMS mirrors, the hinges and associated structure that are necessary to permit the mirrors to be actuated, e.g., rotated, to reflect the focused beam to a desired location, limit the permissible size of the mirror surface. This results in a sub-optimum optical fill factor and, in optical networking applications, a sub-optimum passband. This is particularly true for mirrors which are biaxially movable, since two orthogonal sets of hinges and an associated gimbal or equivalent structure are required. This necessitates a greater space between adjacent minors to accommodate the hinges and associated structure.

MEMS mirrors are conventionally made by either bulk or surface silicon micromachining techniques. Bulk micromachining, which typically produces single-crystal silicon mirrors, is known to have a number of advantages over surface micromachining, which typically produces polysilicon (thin-film) mirrors. For example, single-crystal silicon mirrors produced by bulk micromachining techniques are generally thicker and larger mirrors with smoother surfaces and less intrinsic stress than polysilicon mirrors. Low intrinsic stress and sizeable thickness result in flat mirrors, while smooth surfaces reduce undesired light scattering. An advantage inherent to surface micromachining techniques is that the mirror suspension, e.g., one or more thin-film hinges, can be better defined and therefore made smaller. This allows the MEMS mirror thus produced to have a large rotational range at moderate drive voltages.

U.S. Pat. No. 6,028,689 to Michalicek et al. ("Michalicek et al.") discloses a movable micromirror assembly driven by an electrostatic mechanism. The assembly includes a mirror supported by a plurality of flexure arms situated under the mirror. The flexure arms are in turn mounted on a support post. Because the assembly disclosed by Michalicek et al. is fabricated entirely by way of surface micromachining techniques, the resulting "micromirror" is of the polysilicon (thin-film) type, and is thus subject to the aforementioned disadvantages.

Published International Patent Application No. WO 01/94253 of Chong et al. discloses a MEMS mirror device having a bulk silicon mirror attached to a frame by thin-film hinges. A notable shortcoming of this system is evident in that the thin-film hinges extend from the reflective surface side of the mirror to the frame, hence restricting (or obstructing) the amount of surface area available for optical beam manipulation. This shortcoming further results in a lower optical fill factor in an array of such MEMS devices.

Tuantranont et al. in "Bulk-Etched Micromachined and Flip-Chip Integrated Micromirror Array for Infrared Applications," 2000 IEEE/LEOS International Conference on Optical MEMS, 21024, Kauai, Hawaii (August 2000) disclose an array of deflectable mirrors fabricated by a surface micromachining polysilicon (or "MUMPS") process. An array of polysilicon mirror plates is bonded to another array of thermal bimorph actuators by gold posts using the "flip-chip transfer technique", resulting in trampoline-type polysilicon plates each suspended at its corners by thermal bimorph actuators. In addition to the mirror plates being made of polysilicon (or thin-film), another drawback of the mirror array is the lack of a monolithic structure, which makes the array susceptible to misalignment and other extraneous undesirable effects.

In view of the foregoing, there is a need in the art to provide MEMS apparatus, such as mirrors, that overcome the limitations of prior devices and which have a simple and robust construction.

SUMMARY OF THE INVENTION

In one aspect, the invention provides a MEMS apparatus that includes a bulk element having an optical surface, a planar support layer having a support surface for supporting the bulk element, a base support, and hinge elements movably suspending the support layer from the base support. The hinge elements are disposed in a different plane from the support layer.

In another aspect, the invention affords a MEMS apparatus that includes a base support, a planar support layer having a support surface, and a hinge means for suspending the support layer relative to the base support for movement about two axis. The hinge means are disposed in a different plane from the support layer, and a bulk element which comprises a device layer having an optical surface is supported on the support surface of the support layer.

In yet another aspect, the invention affords an optical apparatus that includes a base support and a plurality of MEMS devices configured in an array. Each MEMS device may comprise a device layer with an optical surface, a planar support layer supporting the device layer, and hinge means for movably suspending the support layer relative to the base. The hinge means are disposed in a different plane from the support layer.

The base support may include a cavity adjacent to which the support layer is positioned and in which at least one electrode is disposed for enabling the support layer and bulk element to be actuated. A reflective layer, e.g., a metallic film, rendering the apparatus thus constructed a MEMS mirror, may be located on the device surface of the bulk element supported on the support layer.

As used herein, the term bulk element refers to an element or component which typically comprises a single-crystal material fabricated by bulk micromachining techniques. The material may be a single-crystal silicon. The bulk element is characterized by having a device layer with an optical surface, also referred to herein as a device surface, which may be substantially planar, and an opposite surface that is situated on an opposite side of the element from the optical surface. The device layer of the bulk element may also be substantially planar, or may assume another geometric form. The optical surface of the bulk element may be optically reflective. It may also be used as an interface for coupling to or supporting other devices or structures. The base support may be a frame or a base substrate to which the bulk element is attached or coupled, as by one or more hinges. A hinge (or "hinge element") should be construed broadly as comprising any suspension or coupling mechanism that enables the bulk element to be movably suspended from the base support, and that further provides a restoring force as the bulk element undergoes motion. For instance, a hinge may be a flexure or flexible coupling, e.g., fabricated by a bulk or surface micromachining technique known in the art. The hinges may be coupled to the support layer opposite to the optical surface and thereby disposed wholly outside of the plane of, e.g., beneath, the optical surface or the support layer. This allows the area of the optical surface of the bulk element to be maximized and permits the entire optical surface to be usable, e.g., for optical reflection. The terms "underneath" or "opposing" with reference to the optical surface or with reference to the support layer refer to a location in an area outside of the plane of the optical surface or the support layer, e.g., on the opposite side of the bulk element from the optical surface, or above or below a plane of extension of the support layer. This enables the area of the optical surface to be maximized relative to that of the base and support layer, affording a high fill-factor. Also, in the figures illustrating side views of the various embodiments of the invention, the optical surface is typically shown on "top" and the opposite surface is typically shown on the "bottom". It will be appreciated, however, that the orientation of the illustrated embodiments of the invention is arbitrary, and that any references herein to direction or to relative position, such as "top", "bottom", "above", "below", etc., are with respect to the illustrations and do not imply a necessary orientation.

The invention further provides methods that may be used for fabricating a MEMS apparatus. In a first process according to the present invention, an apparatus is formed by first and second SOI (Silicon-On-Insulation) wafers, each comprising a single-crystal silicon layer and a silicon handle wafer with an insulation layer, e.g., silicon oxide, sandwiched in between. A first one of the single crystal silicon layers serves as a support layer, and the second one of the single layers serves as a device layer, and, after etching, a post. First and second hinge elements may be fabricated, e.g., by way of surface micromachining techniques, on a surface of the support layer. The post is bonded to the support layer and the silicon handle wafer along with the insulation layer of the first SOI wafer is removed, thereby revealing a second surface of the single-crystal silicon support layer. The support layer is etched. A "base support" is configured to contain a cavity, in which at least one electrode may be disposed. The already bonded device and support layer is bonded on the 'base support' in such a manner that the support layer is positioned adjacent to the cavity. Subsequently, the silicon handle wafer along with the insulation layer in the device layer is removed, thereby revealing a second surface (the optical surface) of the single-crystal silicon device layer. A bulk element may be subsequently produced in the single-crystal silicon device layer by way of bulk micromachining techniques. The configuration may be such that the hinge elements are each anchored to the first surface of the support layer and to the support, thereby enabling the bulk element to be suspended with the hinge elements wholly underneath the optical surface of the device layer. A reflective layer may be further deposited on the optical surface, rendering the apparatus a MEMS mirror.

One advantage of the MEMS apparatus of the invention is that by placing the hinge elements on an opposite side of the bulk element from the optical surface, and in a different plane from either the bulk element or the support layer, the optical surface area of the bulk element can be maximized and the entire optical surface becomes usable, e.g., for optical beam manipulation. This structure is highly advantageous for making arrayed MEMS devices, such as an array of MEMS mirrors with a high optical fill factor. Further, by advantageously using both bulk and surface micromachining techniques, a MEMS mirror according to the invention is characterized by a large and flat mirror along with flexible hinges, and is capable of achieving a substantial rotational range at moderate electrostatic drive voltages. An additional advantage of the MEMS apparatus of the invention is its monolithic structure, rendering it robust in performance. These advantageous features are in notable contrast with the prior devices.

BRIEF DESCRIPTION OF THE FIGURES

FIG. 1A is a cross-sectional side view of a first embodiment of a MEMS apparatus according to the invention;

DETAILED DESCRIPTION OF PREFERRED EMBODIMENTS

Figure 1B:
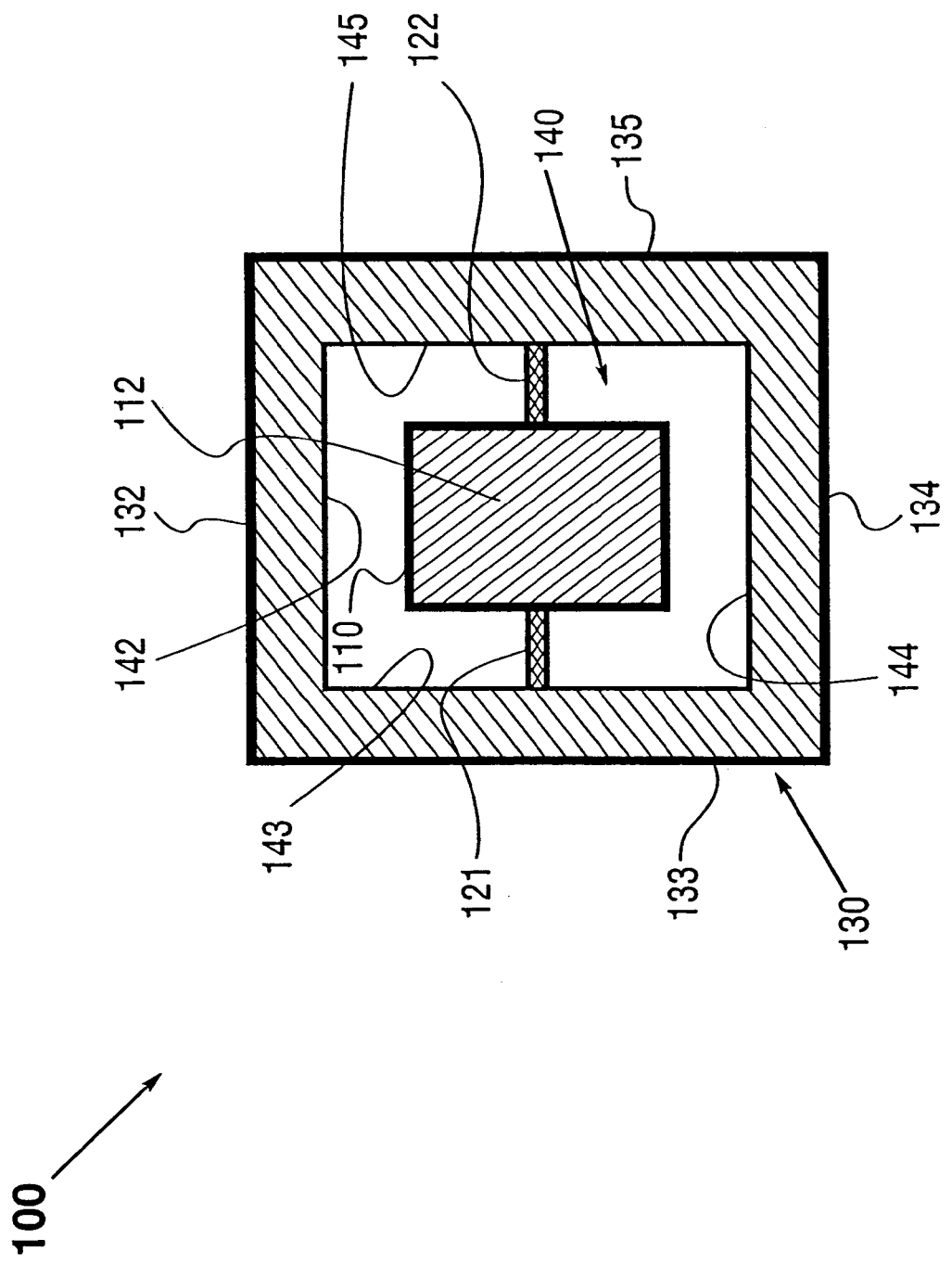
FIG. 1B is a top view of the first embodiment of the MEMS apparatus of FIG. 1A.

FIGS. 1A–1B illustrate a first embodiment of a MEMS apparatus 100, according to the invention. FIG. 1A depicts a cross-sectional side view of the MEMS apparatus 100, which may comprise a bulk element 110, first and second hinge elements 121, 122, and a base support 130. The bulk element 110 may have a device (or "top" in the figures) surface 112, which may be substantially planar, and a "bottom" surface 111 that is disposed below the device surface 112 and on an opposite side of the bulk element. The device surface may be an optical surface, as described more fully herein. The first and second hinge elements 121, 122 may be disposed below the device surface 112, as shown. By way of example, in the embodiment of FIG. 1A, the hinge elements 121, 122 may be coupled to the bottom surface 111 of the bulk element 110 and to the base support 130 to attach or couple the bulk element to the base support. In this manner, the bulk element 110 is suspended from the support by the hinge elements 121, 122 with the hinge elements disposed wholly underneath the bulk element 110.

FIG. 1B shows a top view of the MEMS apparatus 100. By way of example, the device surface 112 of the bulk element 110 may be generally rectangular in shape. It will be appreciated that the device surface of a bulk element (or the bulk element itself) of the invention may assume other geometrical forms, e.g., elliptical.

As shown in FIGS. 1A–1B, the base support 130 may comprise a structure having a substrate portion 131 and a plurality of sidewalls 132, 133, 134, 135 which may extend from the substrate portion 131 to form the a cavity 140. By way of example, the substrate portion 131 may be generally rectangular in shape. As shown in FIG. 1A, hinge elements 121, 122 may be disposed within the cavity 140, and may be coupled to the sidewalls 133, 135. In the embodiment of FIGS. 1A–1B, each of the sidewalls 132, 133, 134, 135 may include a corresponding ridge (or "lip") portion 142, 143, 144, 145 that projects inward from the respective sidewall (see the ridge portions 143, 145 shown in FIG. 1A, for example). The hinge elements 121, 122 may have a generally "C"-shaped as viewed from the side, as shown in FIG. 1A, and may be coupled to the ridge portions 143, 145 of the sidewalls 133, 135, respectively. However, the hinge elements 121, 122 may assume any other suitable shape or cross-section, and they may be coupled to other portions of the sidewalls 133, 135.

In the embodiment shown in FIGS. 1A–1B, the cavity 140 is shown to be generally rectangular in shape. However, the cavity 140 may assume any other suitable geometric form. The cavity 140 may include at least one electrode 141, which may be disposed on a bottom surface 150 of the cavity 140. The electrode 141 is adapted to cause the bulk element 110 to be actuated e.g., rotated, in a known manner, as through electrostatic action. Hinges 121, 122 form an axis about which the bulk element may rotate upon actuation. Moreover, the device surface 112 of the bulk element 110 may be optically reflective, e.g., by way of polishing and/or depositing a metallic film on the surface.

Figure 2:
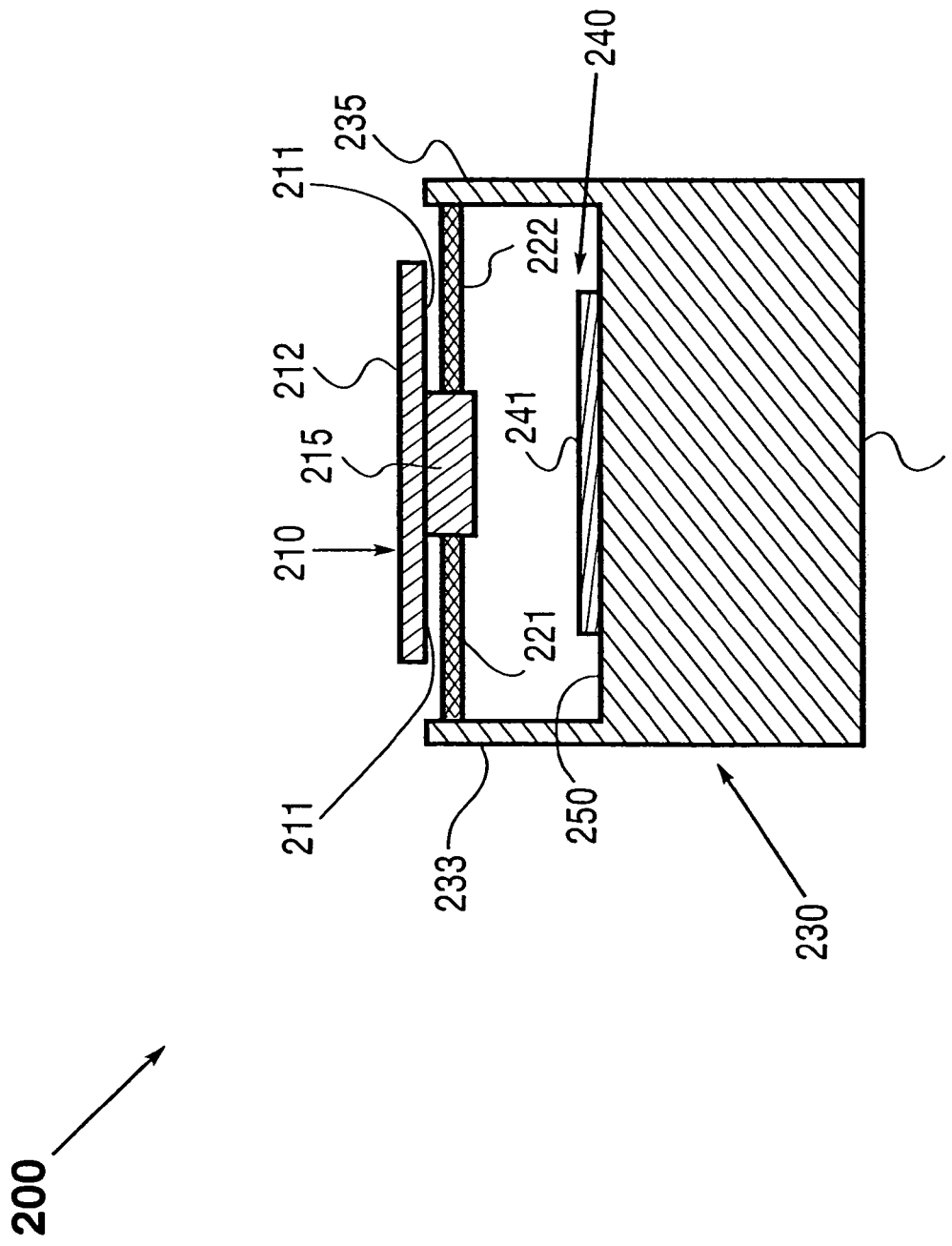
FIG. 2 is a cross-sectional side view of a second embodiment of a MEMS apparatus, according to the invention.

FIG. 2 shows a cross-sectional side view of a second embodiment of a MEMS apparatus in accordance with the invention, which affords a larger device surface area, i.e., higher fill factor, than the embodiment of FIGS. 1A–1B. By way of example, MEMS apparatus 200 may comprise a bulk element 210, first and second hinge elements 221, 222, and a base support 230. The bulk element 210 may include a substantially planar "device" (or "top") surface 212, and a "bottom" surface 211 which is disposed below and on an opposite side of the bulk element from the device surface 212. In this embodiment, the bulk element 210 may further include a base portion 215, which may extend downward (in the figure) from the bottom surface 211. First and second hinge elements 221, 222 may be each disposed below the device surface 212 and coupled to the base portion or post 215 of the bulk element 110 and to the base support 130. In this manner, the bulk element 210 is suspended from the support with the hinge elements 221, 222 disposed wholly underneath the device surface 212. This allows the surface area of device surface 212 to be increased to afford a higher fill factor.

As shown in the embodiment of FIG. 2, the base support 230 may comprise a structure having a substrate portion 231 and a plurality of sidewalls 233, 235 that extend from the substrate portion 231 to form a cavity 240. By way of example, the substrate portion 231 may be generally rectangular in shape. The hinge elements 221, 222 may be disposed within the cavity 240. In the embodiment of FIG. 2, the hinge elements 221, 222 may be planar (instead of C-shaped as in FIG. 1A) and extend in a generally horizontal (in the figure) direction from the base portion 215 to the sidewalls 233, 235, respectively, thereby suspending the base portion and bulk element from the sidewalls. However, the hinge elements 221, 222 may assume any other suitable shape. They may also extend in other directions, and/or be coupled to other portions of the sidewalls 233, 235.

The cavity 240 may be of any suitable shape in the embodiment of FIG. 2. The cavity 240 may include at least one electrode 241, which may be disposed on a bottom surface 250 of the cavity 240. The electrode 241 is adapted to cause the bulk element 210 to be actuated in a known manner, e.g., electrostatically. The optical (device) surface 212 of the bulk element 210 may be rendered optically reflective, e.g., by way of polishing and/or depositing a metallic film on the optical surface.

Figure 3:
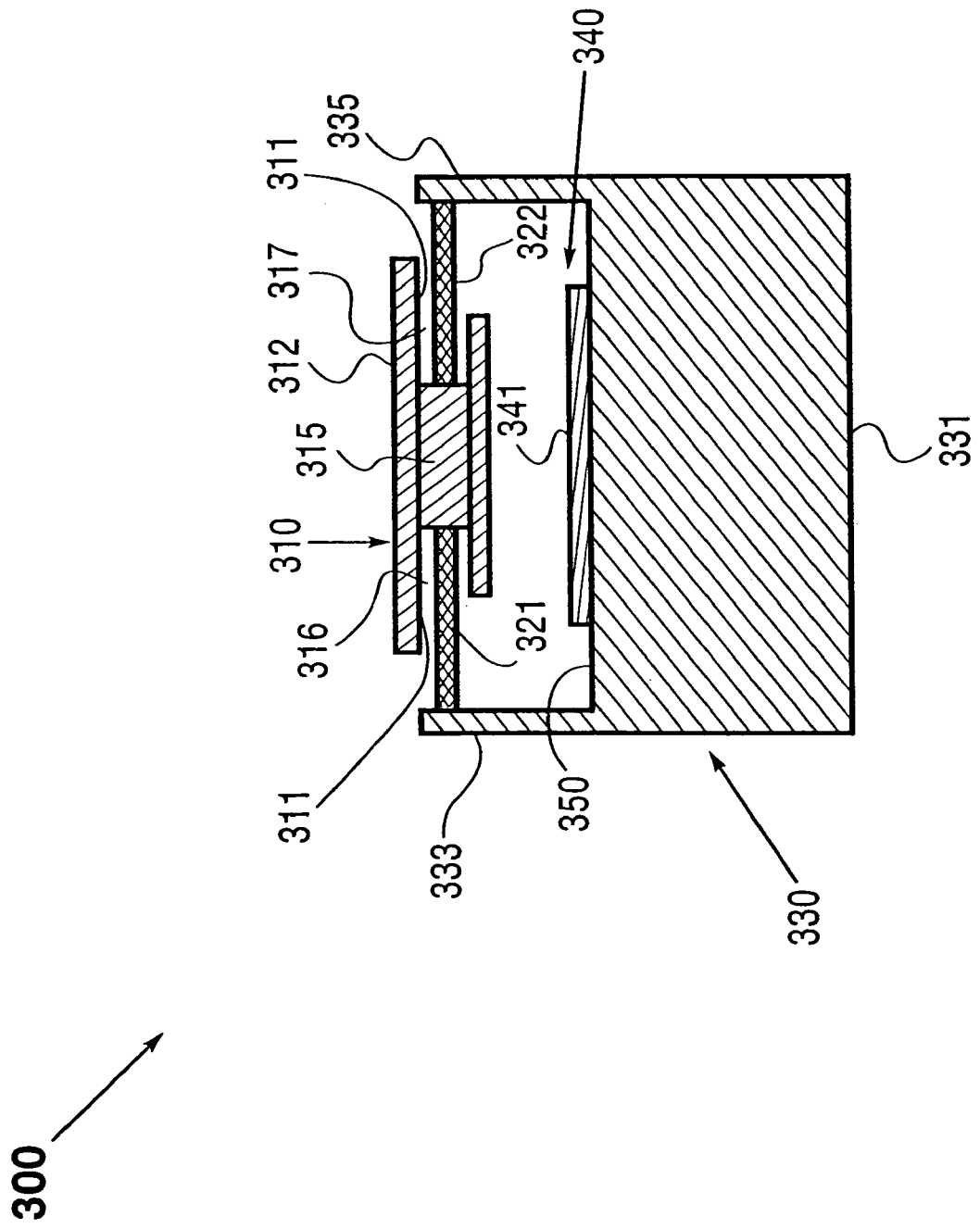
FIG. 3 is a cross-sectional side view of a third embodiment of a MEMS apparatus, according to the invention.

FIG. 3 shows a cross-sectional side view of a third embodiment of a MEMS apparatus 300 in accordance with the invention which also has a higher fill factor than the apparatus of FIGS. 1A–1B. With the exception of a bulk element 310, MEMS apparatus 300 is substantially similar to the MEMS apparatus 200, and may have the general configuration of and similar elements to those of the embodiment shown in FIG. 2. As shown in FIG. 3, the MEMS apparatus 300 may comprise a bulk element 310, first and second hinge elements 321, 322, and a base support 330. The base support 330 may include a cavity 340, which is formed by at least two sidewalls 333, 335 that extend from substrate portion 331. The cavity 340 may include a bottom surface 350, on which at least one electrode 341 may be disposed.

In the MEMS apparatus 300, the bulk element 310 may include a substantially planar device (or optical) top (in the FIG.) surface 312, and a bottom surface 311 which is disposed below and opposes the device surface 312. In contrast to the embodiment of FIG. 2, the bulk element 310 may have a generally T-shaped base portion 315. The base portion 315 may extend downward from the bottom surface 311 and forms side cavities or "voids" 316, 317 in the bulk element 310. As in the embodiment of FIG. 2, the first and second hinge elements 321, 322 are each disposed beneath the bottom surface 311 of the bulk element 310. In the present embodiment, the hinge elements 321, 322 are each shown to be coupled to the base portion 315 of the bulk element 310 within the respective voids 316, 317 formed between the base portion and the respective sidewalls 333, 335 of the support 330. In this manner, the bulk element 310 is suspended with the hinge elements 321, 322 disposed wholly underneath the device surface 311.

In the foregoing embodiments and in an exemplary fabrication process described below, the term "bulk element", e.g., the bulk element 110, 210, or 310, refers to an element fabricated by bulk micromachining techniques known in the art, which typically comprises a single-crystal material. For example, the bulk elements 110, 210, 310 may each be a single-crystal silicon element. The bulk element is characterized by a device layer having a device or optical surface, which may be substantially planar or have a curved shape suitable for a curved reflector, and a bottom surface that is situated below the device surface. The bulk element itself may assume any geometric form that is appropriate for a given application. It will be appreciated that the device and bottom surfaces need not be parallel to one another, and need not have the same shape, in general. The device surface of a bulk element may be optically reflective. An optical element, e.g., a grating, may also be patterned on it. Additionally, the device surface may also be used as an interface for coupling the bulk element to other devices or structures.

Further, a support, e.g., the base support 130, 230, or 330, may be a structure such as a frame or substrate, to which the bulk element is coupled. A hinge (or "hinge element") should be construed broadly as any suspension/coupling means that enables the bulk element to be suspended for movement from the base support or other structure, and further provides the restoring force as the bulk element undergoes motion, e.g., due to the actuation mechanism caused by the electrode 141 of FIGS. 1A–1B. As a way of example, the first or second hinge element shown in FIG. 1A, 2, or 3 may be a flexure or flexible coupling, e.g., fabricated by bulk or surface micromachining techniques known in the art. While two hinge elements are shown in each of the foregoing embodiments, other embodiments may include a fewer or greater number of hinge elements. The term "underneath" refers to a hinge element being anchored to (or below) the bottom surface of the bulk element and thereby disposed wholly beneath the device surface. This allows the device surface area of the bulk element to be maximized and the entire surface to be usable, e.g., for optical beam manipulation, as the above embodiments illustrate.

Figure 4A:
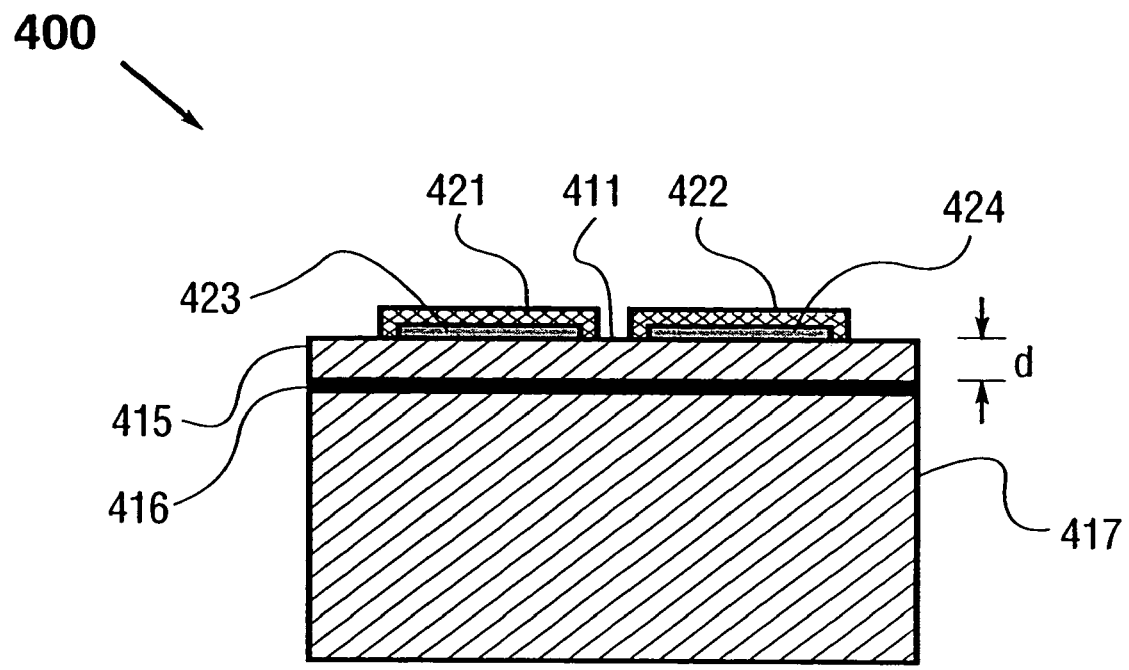
FIGS. 4A–4F show an exemplary process for fabricating a MEMS apparatus, according to the invention.

FIGS. 4A–4F show an embodiment of a process which may be utilized for fabricating a MEMS apparatus, e.g., the embodiment of FIGS. 1A–1B, according to the invention. FIG. 4A shows a cross-sectional side view of a "device" component 400, which in one form may be an SOI (Silicon On Insulator) wafer, comprising a single-crystal silicon "device" layer 415 and a silicon "handle wafer" 417 with a first insulation layer 416, e.g., silicon oxide, sandwiched therein between. The single-crystal silicon device layer 415 may have a predetermined thickness d, which may be on the order of 5–100 μm, for example. First and second hinge elements 421, 422 may be fabricated on a first surface 411 of the single-crystal silicon device layer 415 in a known manner, e.g., by a known surface micromachining technique. Each hinge element may be a thin-film material, e.g., composed of polysilicon, polyoxide, nitride, silicon nitride, silicon oxide, silicon oxynitride, or a metal. First and second "sacrificial" elements 423, 424 (which may be formed from silicon oxide) may be first patterned on the first surface 411, prior to forming the first and second hinge elements 421, 422, respectively.

Figure 4B:
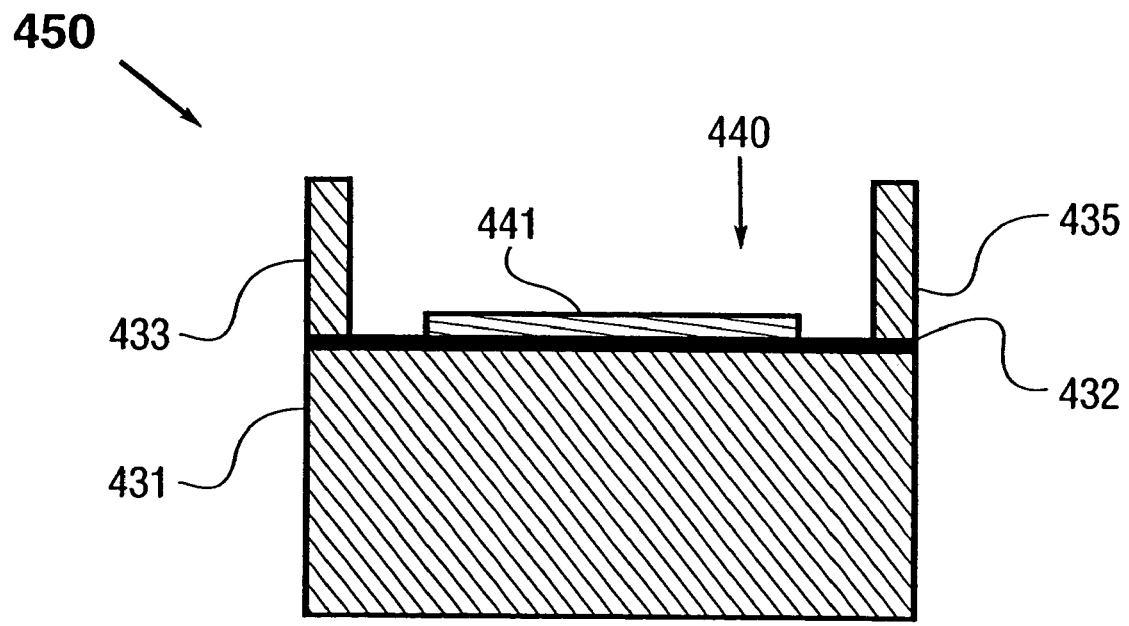

FIG. 4B shows a cross-sectional side view of a "base support" component 450 containing an "open-ended" cavity 440. As a way of example, the cavity 440 may be formed by a substrate wafer 431 and a plurality of spacers 433, 435 which form sidewalls of the cavity 440. There may be at least one electrode 441 disposed in the cavity 440, e.g., patterned on the substrate wafer 431 via a second insulation layer 432 which may be made of silicon oxide.

Figure 4C:
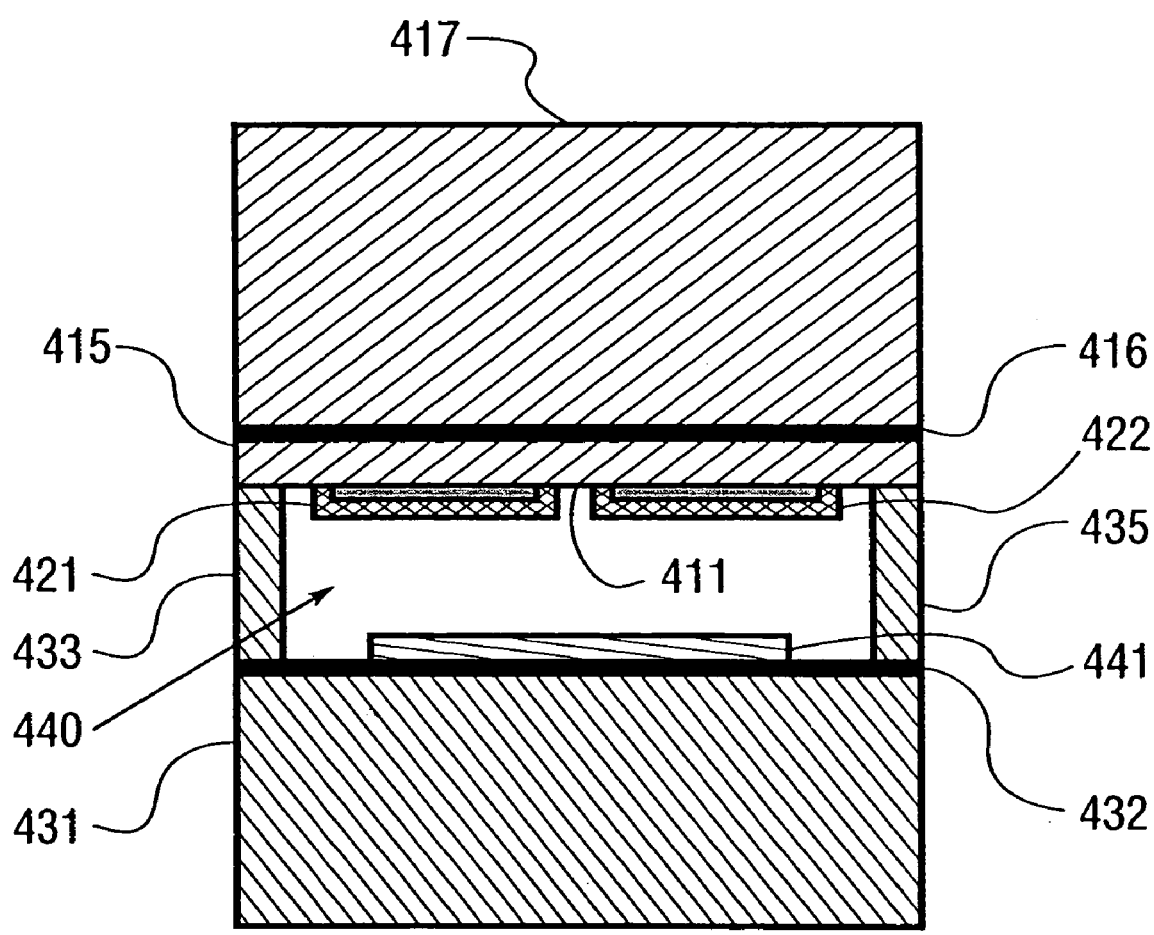
Figure 4D:
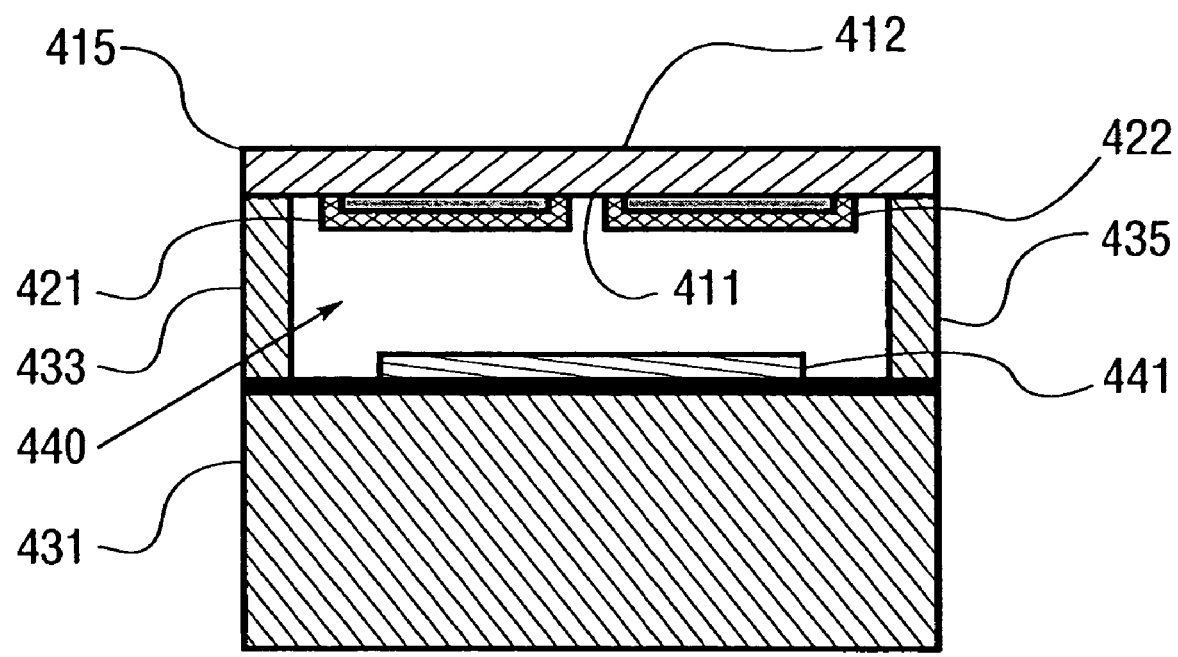

Referring now to FIG. 4C. The device 400 formed in FIG. 4A is bonded with the base support component 450 of FIG. 4B in such a manner that the first and second hinge elements 421, 422 are disposed (or accommodated) within the cavity 440. In the next step of the fabrication process, illustrated in FIG. 4D, the silicon handle wafer 417 and the first insulation layer 416 are removed, thereby revealing a second surface 412 of the single-crystal silicon device layer 415.

Figure 4E:
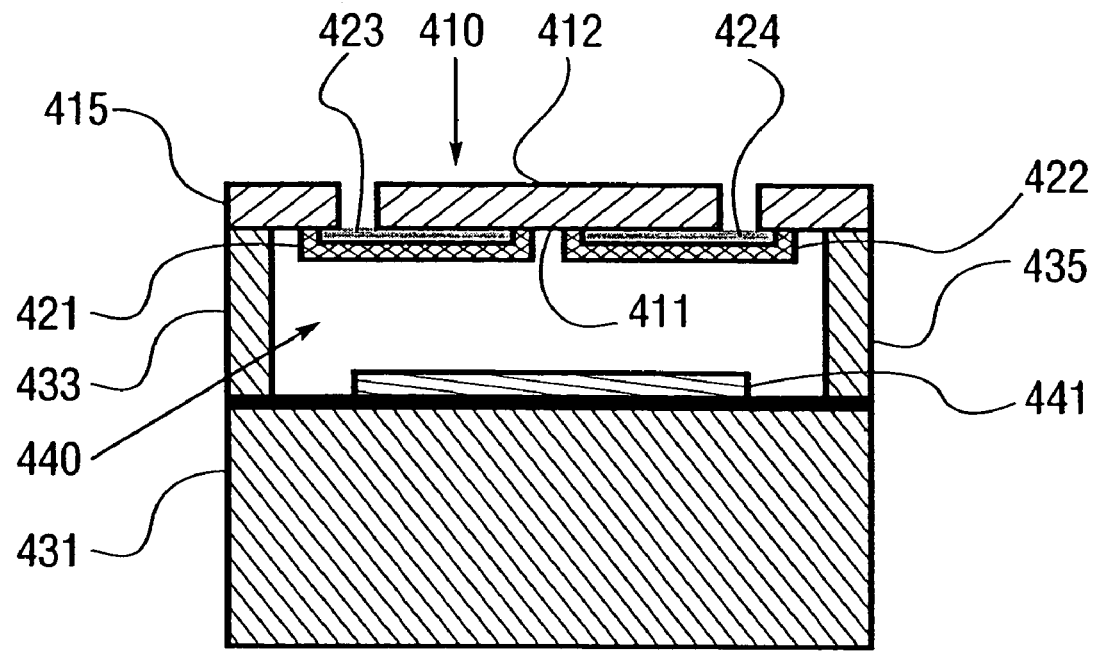

In the next step of the fabrication process, depicted in FIG. 4E, a "bulk element" 410 is formed in the single-crystal silicon device layer 415, as by a known bulk micromachining technique, e.g., a DRIE (Deep Reactive Ion Etching) process. The formed bulk element 410 is also characterized by the first and second surfaces 411, 412 that oppose one another. In the next step of the fabrication process, shown in FIG. 4F, the bulk element 410 is "released" by removing the first and second sacrificial elements 423, 424. Note that the remainder of the single-crystal silicon device layer 415, the spacers 433, 435, and the support wafer 431 form an integrated support structure 430, which may substantially constitute the support 130 in the embodiment of FIGS. 1A–1B, for instance. (Those skilled in the art will appreciate that first and second sacrificial elements 423, 424 may also be removed earlier, e.g., after the formation of hinges 421, 422 in the step of FIG. 4A.)

Figure 4F:
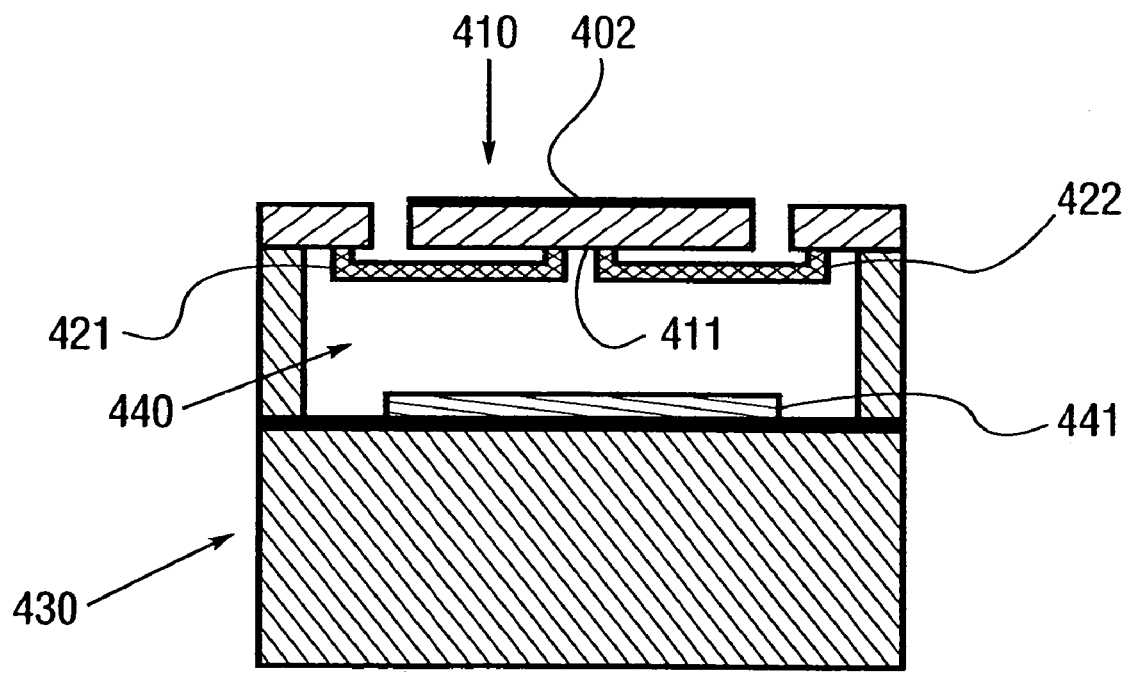

A reflective layer 402, e.g., a gold film, may be deposited on the second surface 412 of the bulk element 410, as shown in FIG. 4F, rendering the apparatus a MEMS mirror. Note that because the first and second hinge elements 421, 422 are anchored to the first (or "bottom") surface 411 and are wholly "underneath" the bulk element 410. Thus, the second (or "device") surface 412 of the bulk element 410 can be maximized and the entire surface becomes usable, e.g., for optical reflection. Furthermore, being situated in a cavity, e.g., the cavity 440, the first and second hinge elements 421, 422 can be made appropriately long and/or large for a given application.

In this process, the use of an SOI wafer for the device component 400 of FIG. 4A has the advantages of providing precise control of the thickness of the bulk element 410 (by way of the predetermined thickness d of the single-crystal silicon device layer of the SOI wafer) and ease in manipulation (owing to the handle wafer of the SOI wafer), while the intervening insulation layer of the SOI wafer may serve as a convenient "etch-stop", e.g., when removing the handle wafer. The hinge elements may also be fabricated by a known bulk micromachining technique, as, e.g., the SCREAM (Single Crystal Reactive Etching and Metallization) process known in the art. It will be appreciated, however, that a device in the present invention may alternatively be formed in an epitaxial silicon wafer, or in a piece of single-crystal silicon, where the hinge elements may be fabricated in a manner similar to that described above.

The base support component 450 of FIG. 4B may likewise be fabricated out of an SOI wafer similar to that shown in FIG. 4A. By way of example, the silicon device layer, e.g., 50–100 μm in thickness, of the SOI wafer may be used to form the spacers 433, 435 along with the electrode 441, e.g., by etching, while the corresponding handle wafer may serve as the substrate wafer 431. Alternatively, a glass wafer may be used to form the substrate wafer 431, on which the electrode 441 may be deposited, e.g., by a known surface micromachining technique, and the spacers 433, 435, e.g., of silicon, are bonded. The base support component 450 of FIG. 4B may also be fabricated out of a single piece of a desired material, e.g., a silicon or glass wafer, using techniques known in the art. Those skilled in the art will appreciate that a support component in the present invention may generally be configured in any way that is suitable for a given application; what is important is that the support element thus configured contains an open-ended cavity (so as to host the hinge elements), e.g., in a manner as illustrated with respect to FIG. 4B.

A distinct feature of the fabrication process of FIGS. 4A–4F is that the device 400 and the base support 450 may be bonded in such a manner that the hinge elements are disposed within (or accommodated by) the cavity 440 of the base support 450 (e.g., see FIG. 4C above), thereby allowing the hinge elements to be situated "underneath" the bulk element thus produced. One skilled in the art will know how to apply a suitable process that is effective for carrying out the requisite bonding, e.g., fusion or anodic bonding. It will be appreciated that various elements in the embodiment of FIGS. 4A–4F are shown by way of example to illustrate the general principles of the present invention, and therefore are not drawn to scale, e.g., in either geometric shape or size. From the teaching of the present invention, those skilled in the art will know how to implement the fabrication process of FIGS. 4A–4F to produce a suitable MEMS apparatus according to the present invention.

Figure 5A:
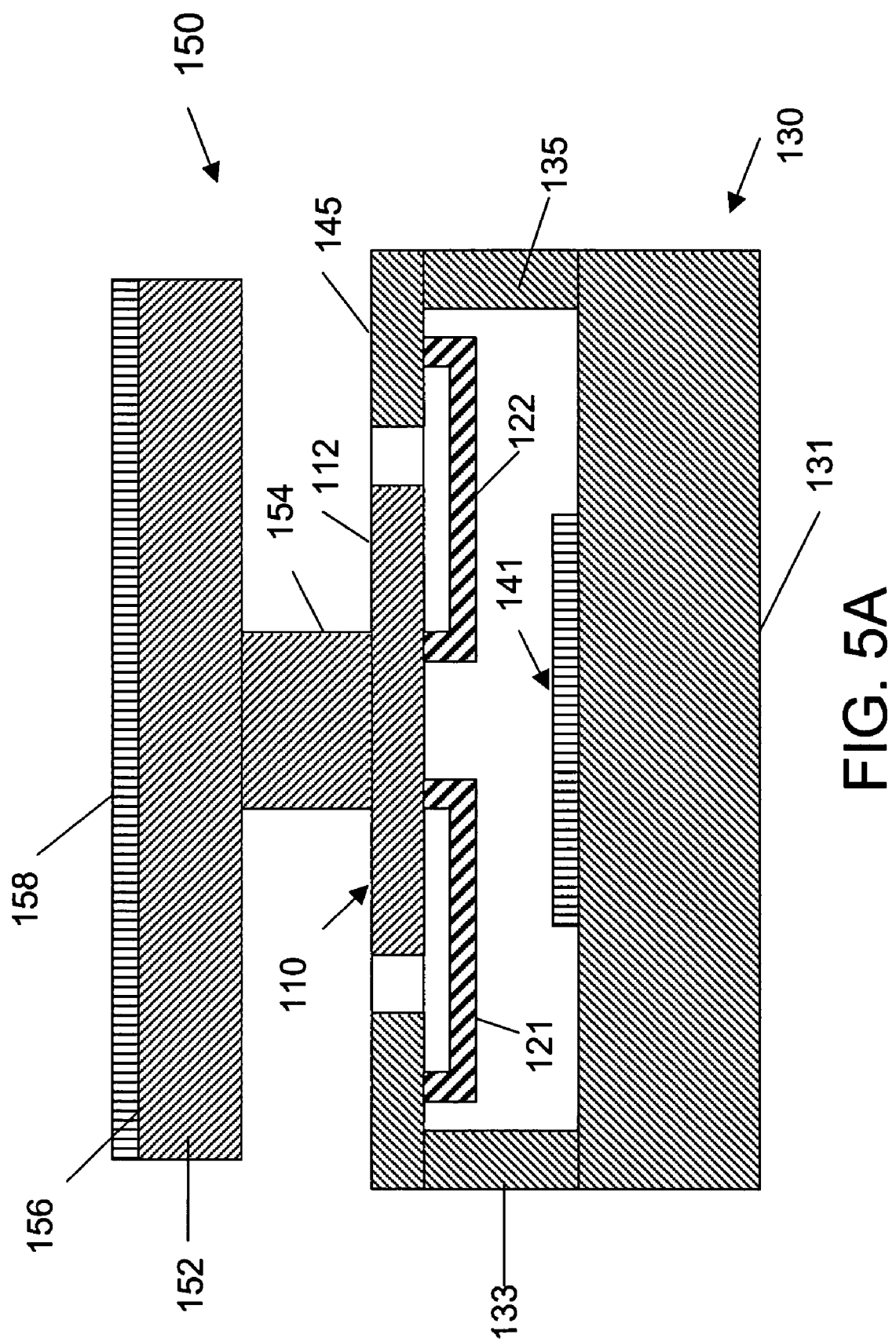
FIG. 5A comprises a cross-sectional side view of a fourth embodiment of a MEMS apparatus according to the invention which affords a high fill factor.

FIG. 5A illustrates a fourth embodiment of MEMS apparatus in accordance with the invention. The embodiment of FIG. 5A comprises a modification of the embodiment of FIGS. 1A–1B, but provides a MEMS apparatus having a larger optical surface area and a higher fill factor. In FIG. 5A, similar elements to those shown in FIGS. 1A–1B are indicated by the same reference numerals.

As shown in FIG. 5A, in the fourth embodiment the bulk element 110 of FIG. 1A serves as a substantially planar support layer having a support surface 112, and a second bulk element 150 comprising a device layer 152 having a device or optical surface 156 and a pedestal or post 154 is supported on support layer 110. As shown, device layer 152 may comprise a structure which is connected to the support surface 112 of the planar support layer 110 by the post 154, imparting to structure 150 a generally T-shape, as shown. Optical surface 156, which may also be substantially planar, may have a reflective layer 158 deposited thereon to form a MEMS mirror. Hinges 121–122 movably suspend the support layer from the base support. As shown, the hinges are located in a different plane from the plane of the support layer (e.g., below the support layer plane in FIG. 5A).

The embodiment of FIG. 5A is advantageous in that device layer 152 may be sized to be substantially the same size as (or larger than) the dimensions of the base support 130 to optimize the surface area of optical surface 156 while still permitting substantial rotation of the device layer about an axis formed by hinges 121–122 to reflect a beam that is incident upon reflective layer 158. By enabling the surface area of reflective layer 158 to be maximized relative to the base support 130, a high fill factor and, accordingly, a high passband MEMS mirror is afforded. As may be appreciated, the height of pedestal 154 may be selected relative to the dimensions of the device layer 152 of the bulk element to position the device layer 152 sufficiently above the support to enable a desired angular movement about hinge elements 121, 122 before the device layer contacts the top ridge 145 of the base support.

Figure 5B:
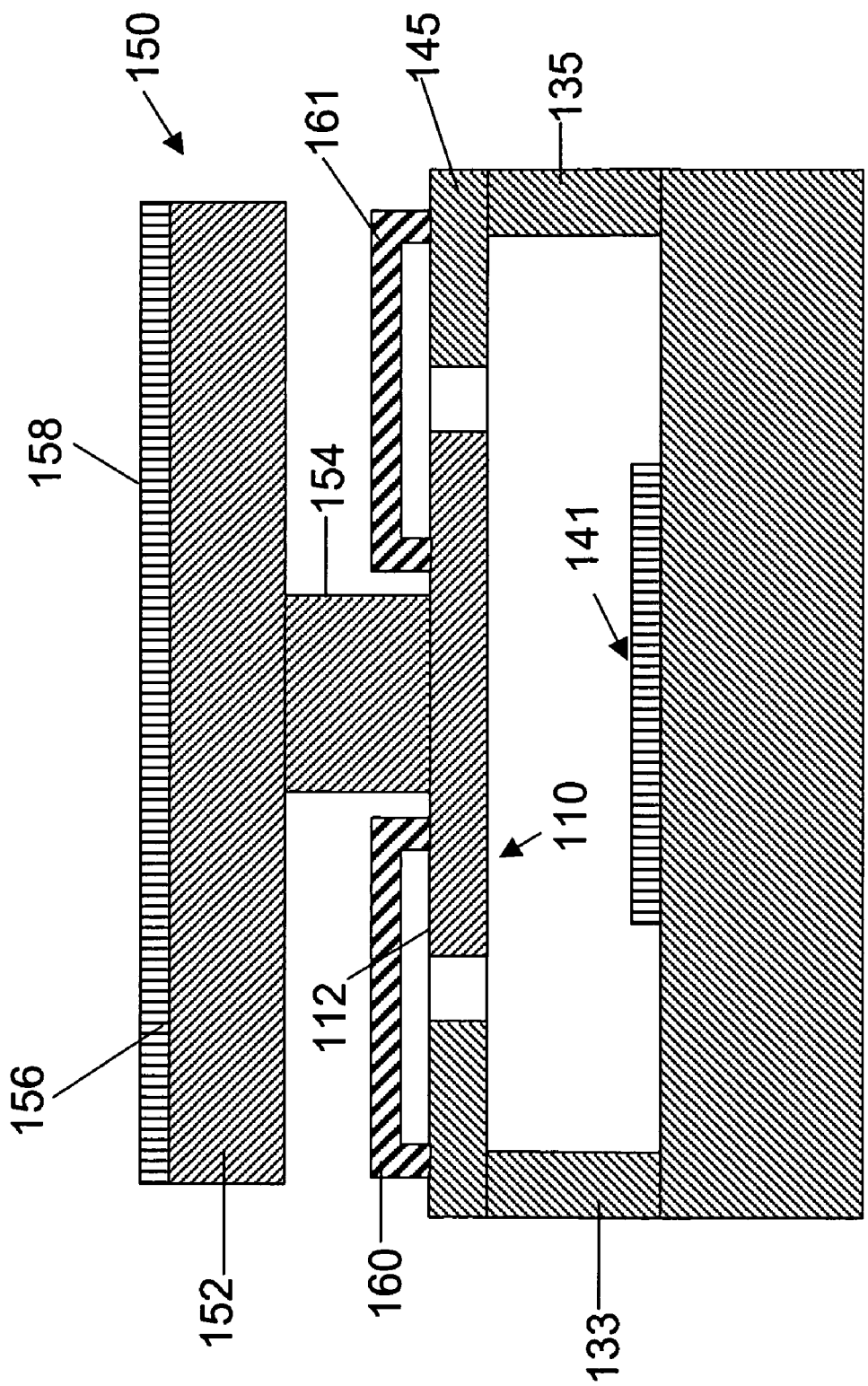
FIG. 5B is a cross-sectional side view of a fifth embodiment of a MEMS apparatus according to the invention which provides a high fill factor.

FIG. 5B illustrates a modification of the embodiment of FIG. 5A in which the hinges 160–161 which movably suspend the planar support layer 110 from base support 130 are relocated in a plane above the plane of the support layer 110, and are connected to the top surface 112 of the support layer and to the top of ridge 145 of the base support. In other respects, the embodiment of FIG. 5B may be substantially the same as shown in FIG. 5A.

Figure 6:
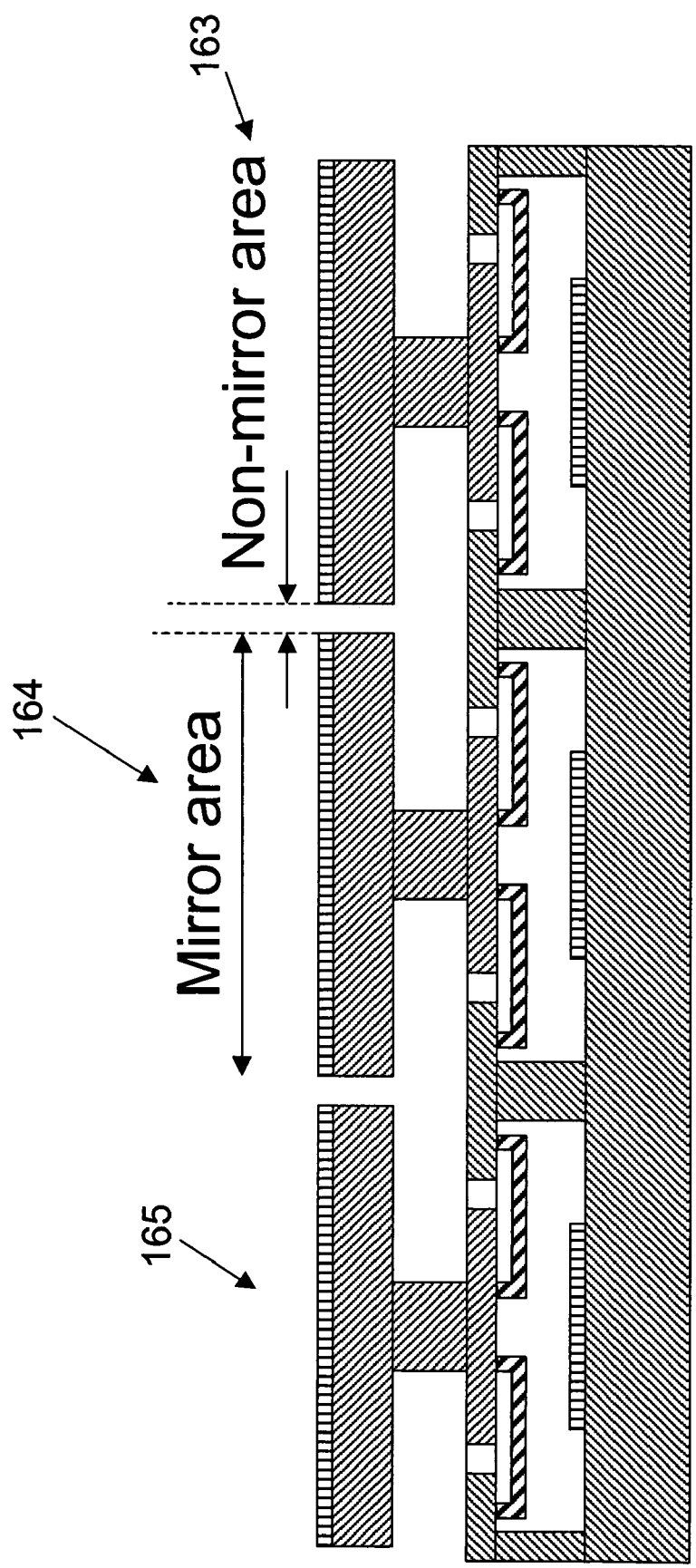
FIG. 6 is a cross-sectional side view of a MEMS apparatus comprising an array of MEMS apparatus of the type shown in FIG. 5A.

FIG. 6 shows the advantage of a high fill factor MEMS apparatus of the type shown in FIG. 5A when used in a MEMS array. As shown in FIG. 6, a plurality of MEMS apparatus 163–165 of the type shown in FIG. 5A may be disposed adjacent to one another to form a mirror array. As indicated in the figure, the high fill factor design affords a high ratio of mirror area to non-mirror area.

Figure 7:
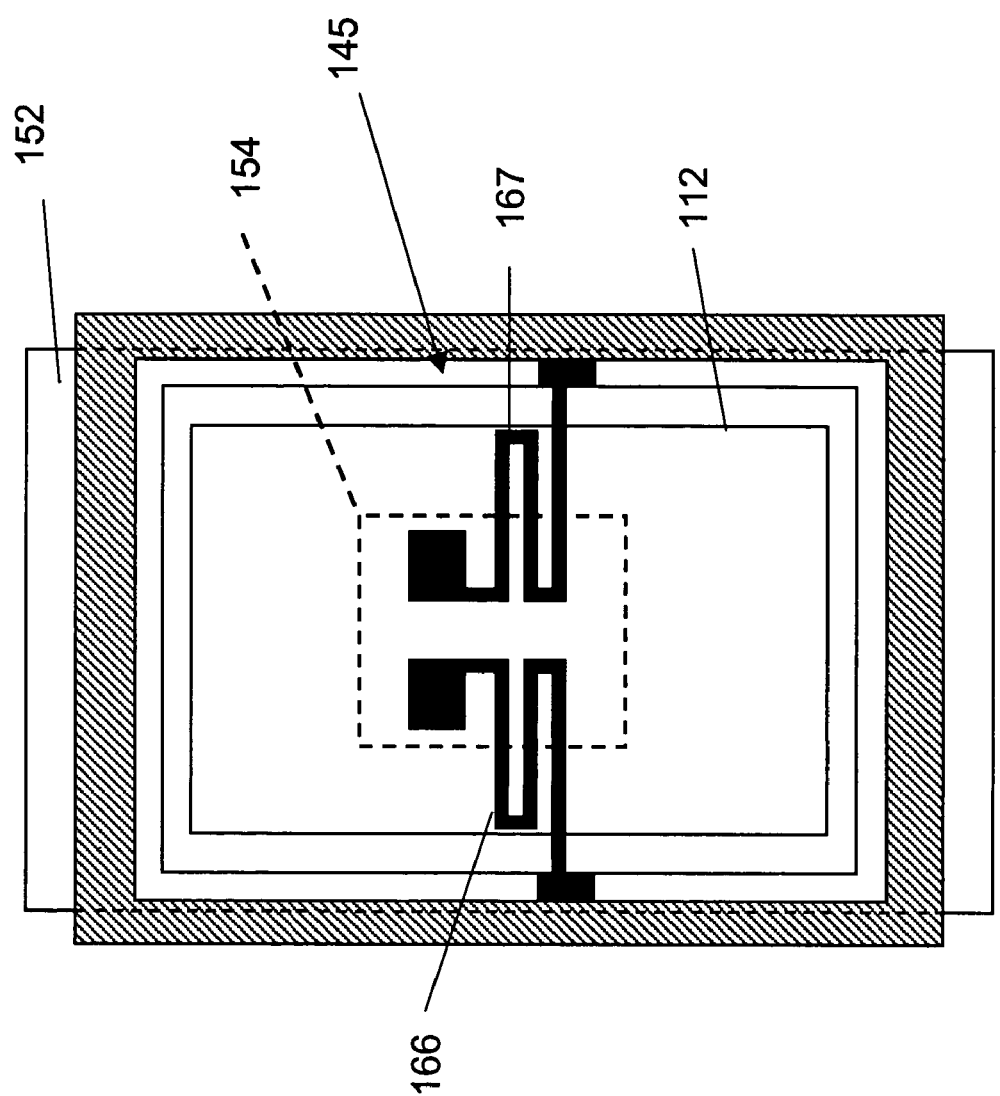
FIG. 7 is a bottom cross-sectional view of a MEMS apparatus of the type shown in FIG. 5A which employs serpentine hinges.

The bottom view of FIG. 7 illustrates another modification of the embodiment of FIG. 5A that uses serpentine-shaped hinge elements 166–167 to suspend the support layer 112 with respect to the ridge 145 of the base support 131. The serpentine shape shown in FIG. 7 is representative of several other shapes which the hinge elements may assume.

Figure 8:
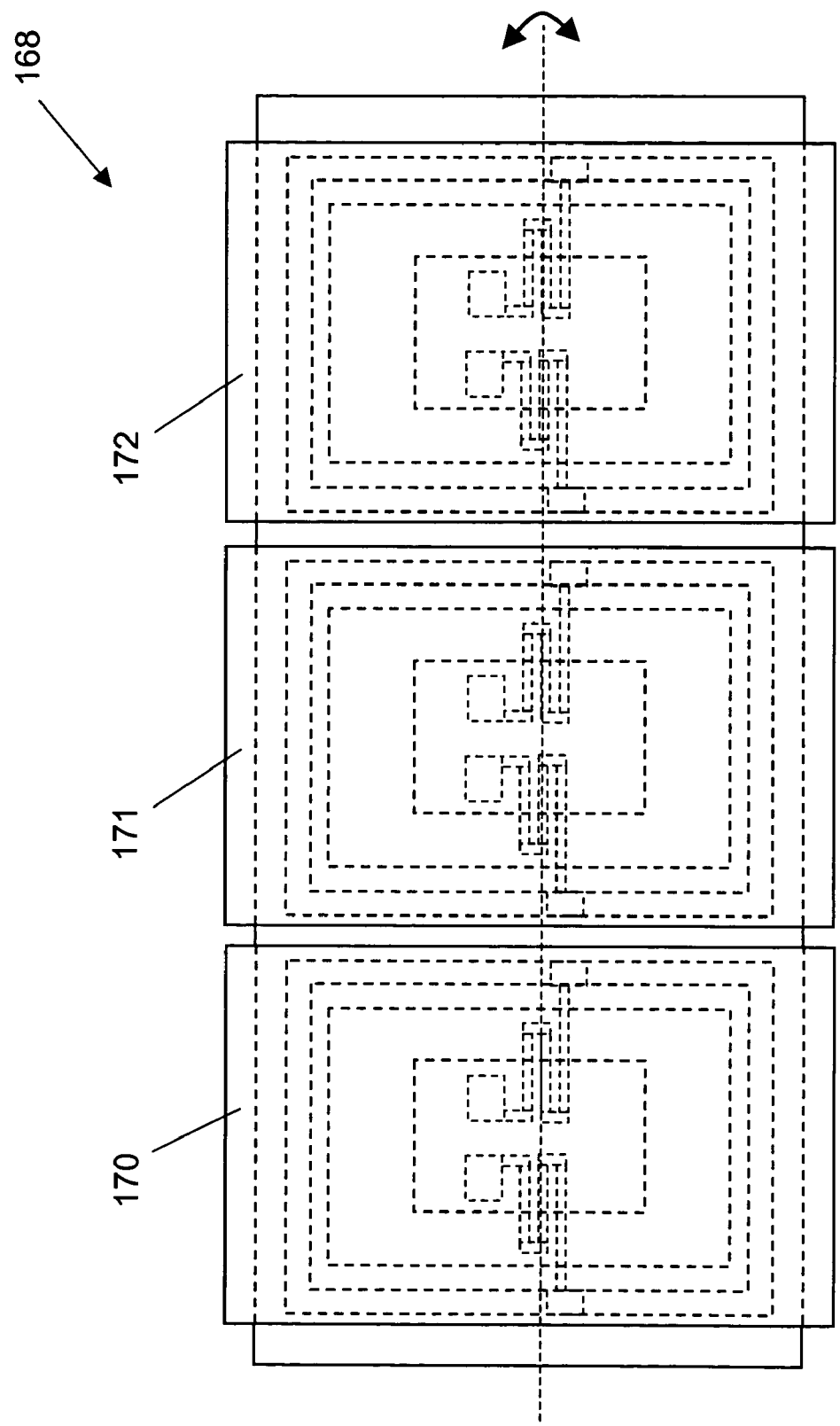
FIG. 8 is a top view of a MEMS apparatus comprising an array of MEMS devices of the type illustrated in FIG. 7.

FIG. 8 is a top view of another mirror array 168 employing high fill factor MEMS apparatus 170–172 of the type illustrated in FIG. 7. As is evident from the figures, the MEMS mirrors are uni-axial devices, and actuation of the mirrors causes them to rotate about a horizontal axis (in the figure) formed by the hinges 166–167. Since all of the mirrors rotate about the same horizontal axis in FIG. 8, it will be appreciated that the horizontal dimensions of the mirrors can be maximized with a relatively small clearance space between adjacent mirrors sufficient to permit unobstructed movement. As is also shown, the vertical dimension (in the figure) of the mirrors orthogonal to the axis of rotation may be larger than the base support since it is not necessary to restrict the vertical dimension to afford clearance for an adjacent mirror. This affords a high passband MEMS array.

Figure 9A:
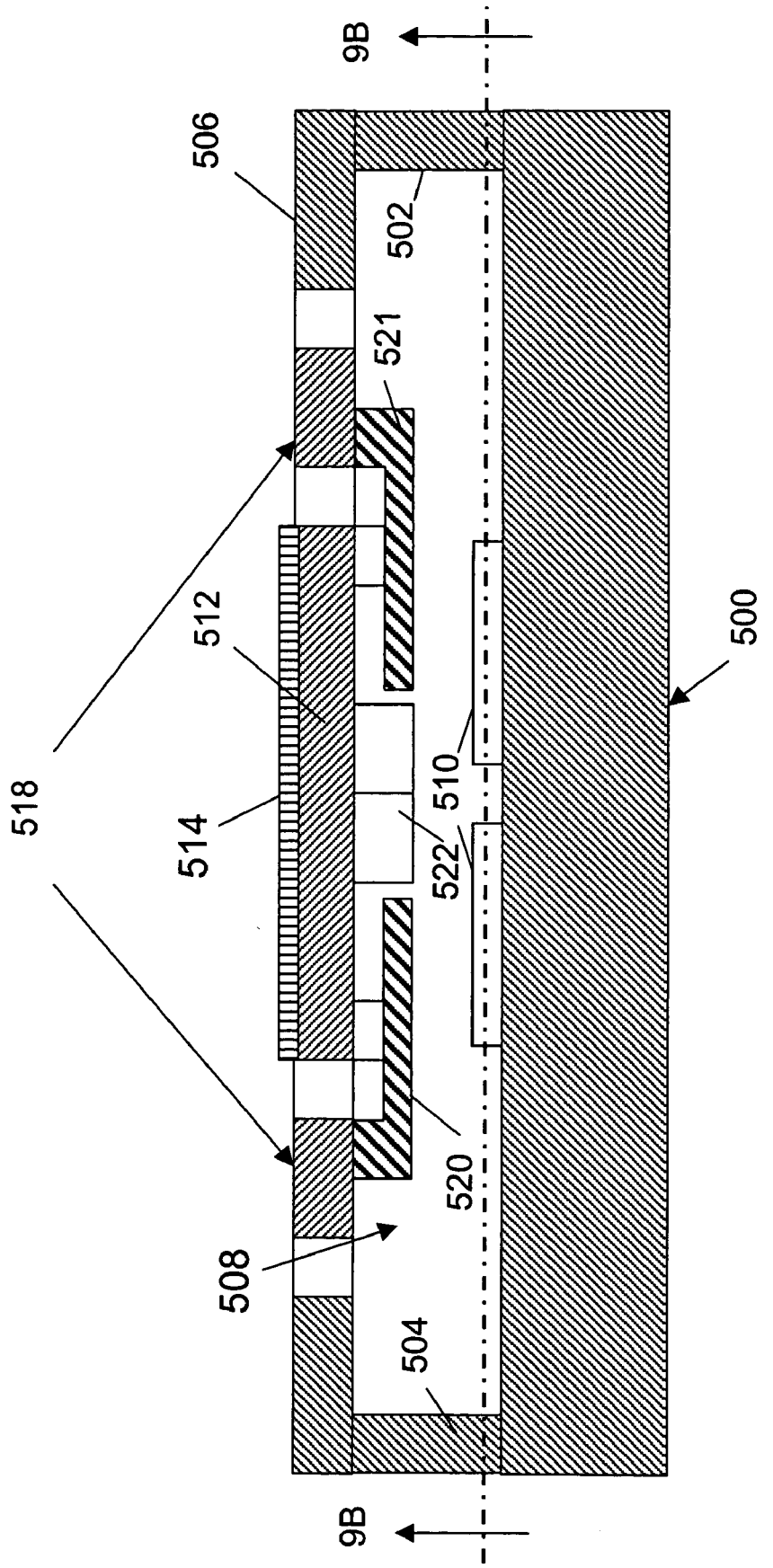
FIG. 9A is a cross-sectional side view taken along the lines 9A—9A of FIG. 9B of a bi-axial low fill factor MEMS apparatus.
Figure 9B:
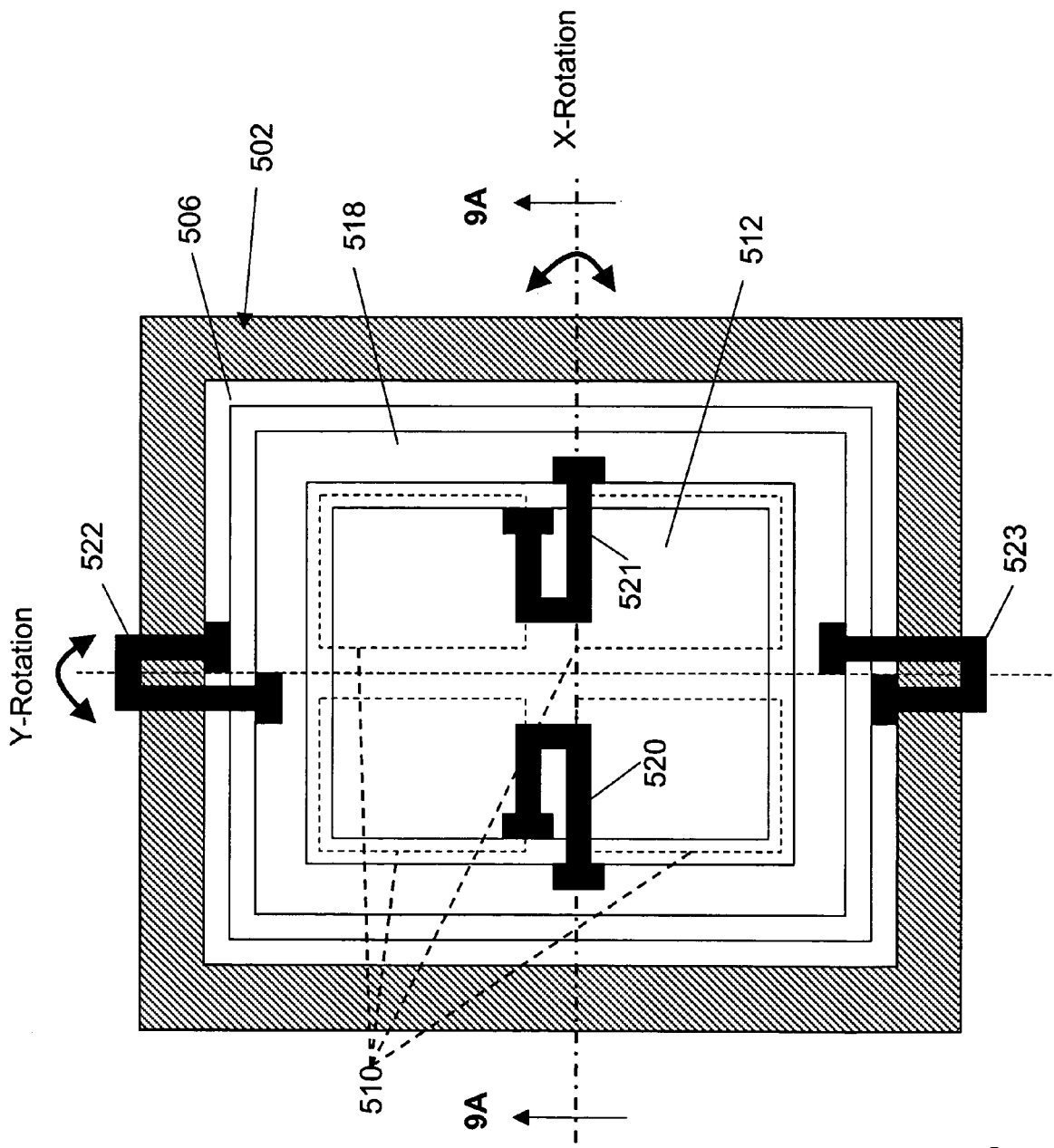
FIG. 9B is a cross-sectional bottom view of the bi-axial MEMS apparatus of FIG. 9A taken along the lines 9B—9B.

FIGS. 9A–9B illustrate an embodiment of a lower fill factor MEMS apparatus which is capable of bi-axial movement. As shown in the figures, the MEMS apparatus may comprise a base support 500 have sidewalls 502 and 504 with a top portion 506 forming a ridge at the top of the sidewalls. The sidewalls and ridge form a cavity 508 in which a plurality of electrodes 510 may be disposed for actuating a bulk element comprising a device layer 512 having a reflector layer 514 disposed thereon to form a mirror. As shown in FIG. 9B, a first pair of hinge elements 520–521, each of which may be U-shaped as shown, affords rotation about a horizontal or x-axis; and a second pair of hinge elements 522–523, which also may be U-shaped, affords rotation about a second vertical or y-axis to permit bi-axial movement. To enable the bi-axial movement, a separate intermediate support such as a gimbal 518, preferably comprising a frame (as shown in the figure), is coupled to the ridges 506 of support 500 by the hinges 522–523. Hinges 520–521 may couple the gimbal 518 to the device layer 512 which carries the mirror 514. As best illustrated in FIG. 9B, this enables the device layer and mirror to rotate about the x-axis relative to the gimbal 518, and permits the gimbal to rotate about the y-axis relative to the base support.

Figure 10A:
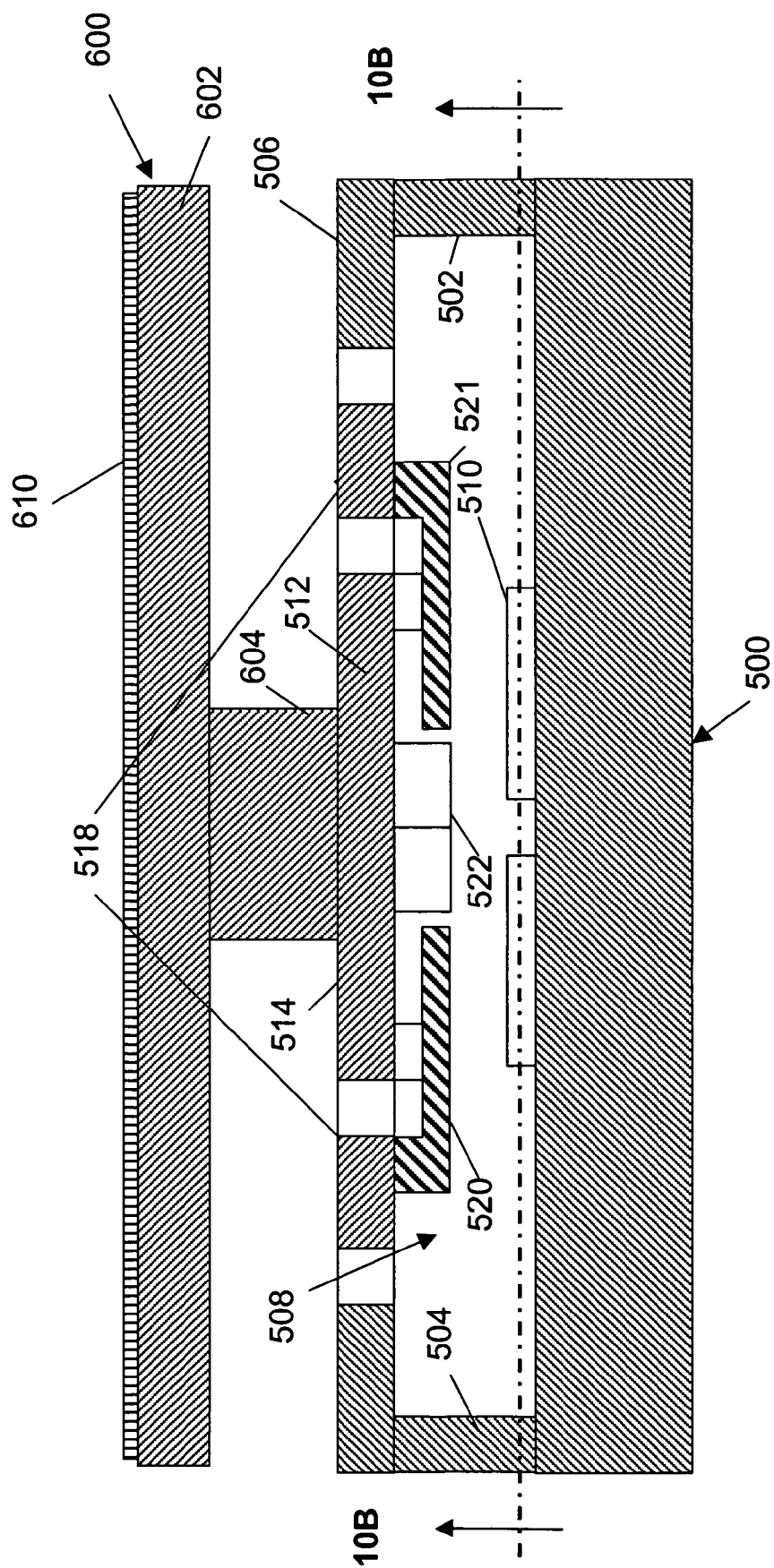
FIG. 10A is a cross-sectional side view of a high fill factor MEMS apparatus taken along the lines 10A—10A of FIG. 10B.
Figure 10B:
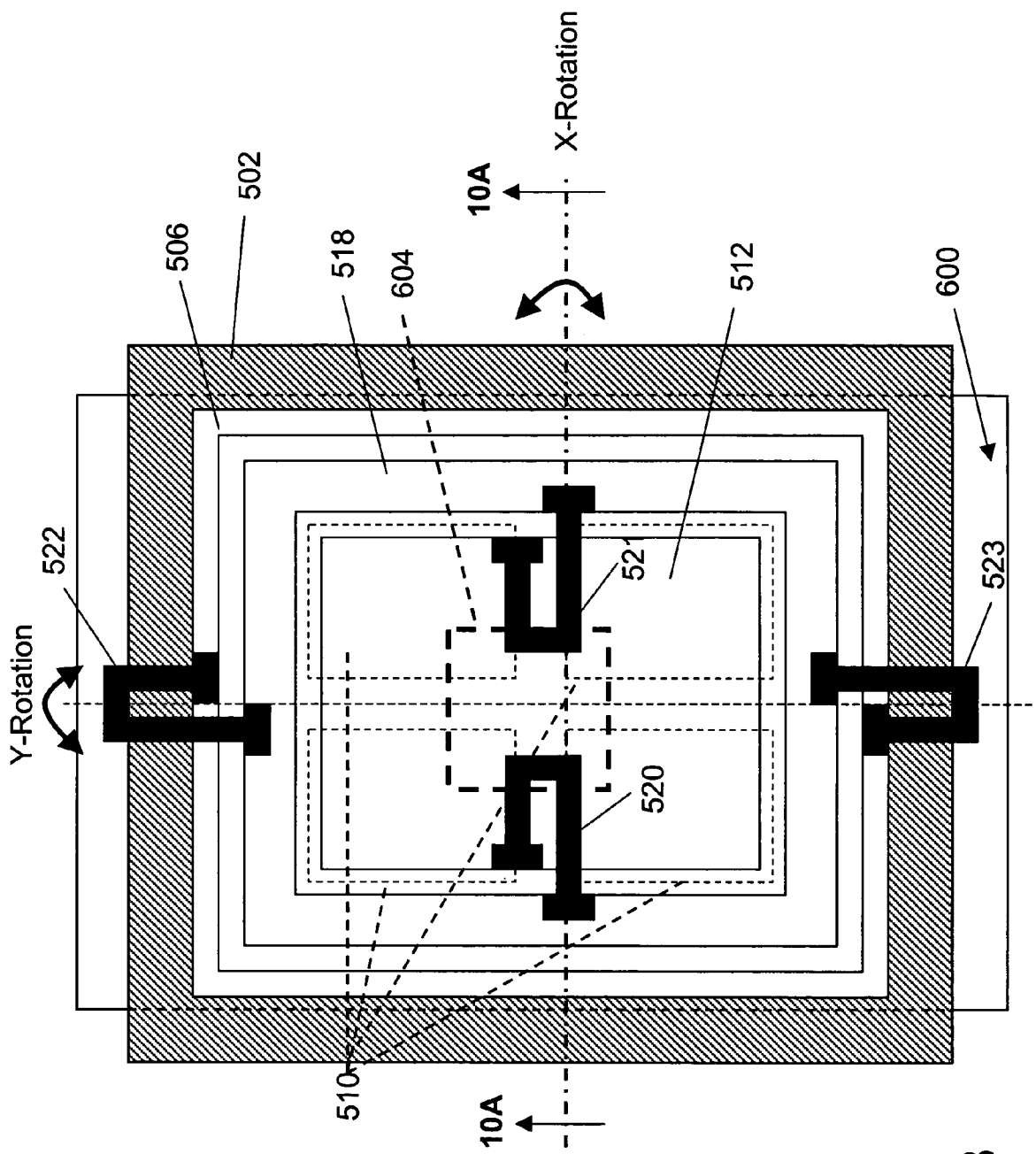
FIG. 10B is a cross-sectional bottom view of the bi-axial high fill factor MEMS apparatus of FIG. 10A taken along the lines 10B—10B.

As shown in FIGS. 9A–9B, the surface area of mirror 514 is limited to the open interior area of the gimbal 518 frame since the device layer 512 and the gimbal 518 are in planar arrangement. Accordingly, the mirror has a lower fill factor since the optical surface area comprises a small portion of the total base area. FIGS. 10A–10B illustrate a modification of the embodiment of FIGS. 9A–9B which afford a high fill factor MEMS apparatus. As shown in FIGS. 10A–10B, the device layer 512 of the modified embodiment may serve as a support layer (instead of a device layer) that supports a separate bulk element 600. As shown, bulk element 600 may comprise a substantially planar device layer 602 supported on the top surface 514 of support layer 512 by a pedestal or post 604, similar to the embodiments of FIGS. 5A–5B. The upper optical surface of device layer 602 may be provided with a reflective layer to form a mirror 610. In other respects, the remaining elements may be the same as in the embodiment of FIGS. 9A–9B.

As is apparent from the figures, in the embodiment of FIGS. 10A–10B, the optical surface has dimensions that may be of the order of (larger or smaller than) the outer dimensions of the base support. As explained above, the dimensions of the optical surface are limited by the need to afford clearance to an adjacent element or structure, and the optical surface may be larger than the outer dimensions of the base support. This enables the surface area of the mirror 610 to be maximized relative to the area of the base support, and affords a substantially higher fill factor, and higher passband, than the embodiment of FIGS. 9A–9B.

Figure 11A:
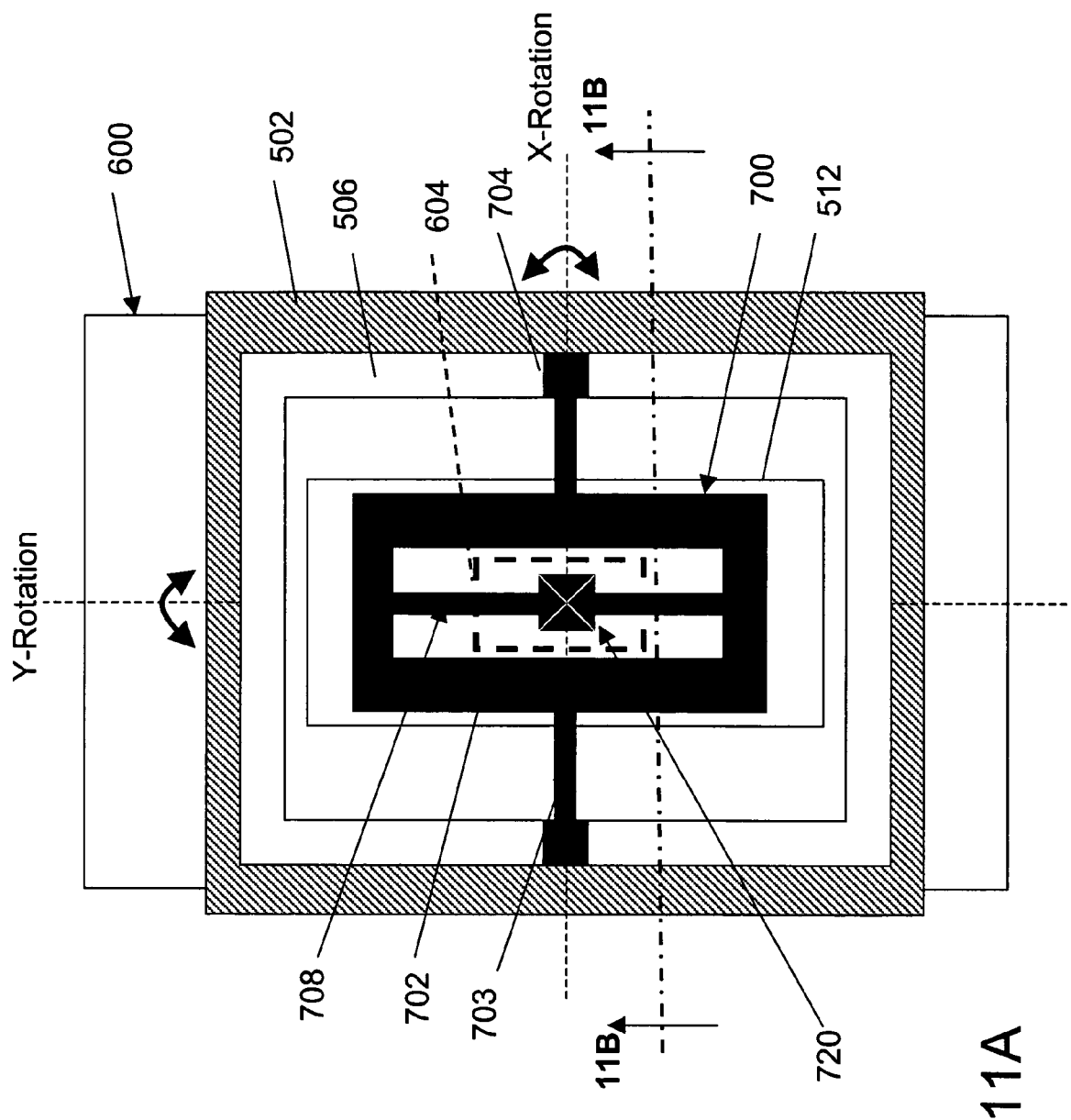
FIG. 11A is a cross-sectional bottom view of another embodiment of a bi-axial high fill factor MEMS apparatus taken along the lines 11A—11A of FIG. 11B.
Figure 11B:
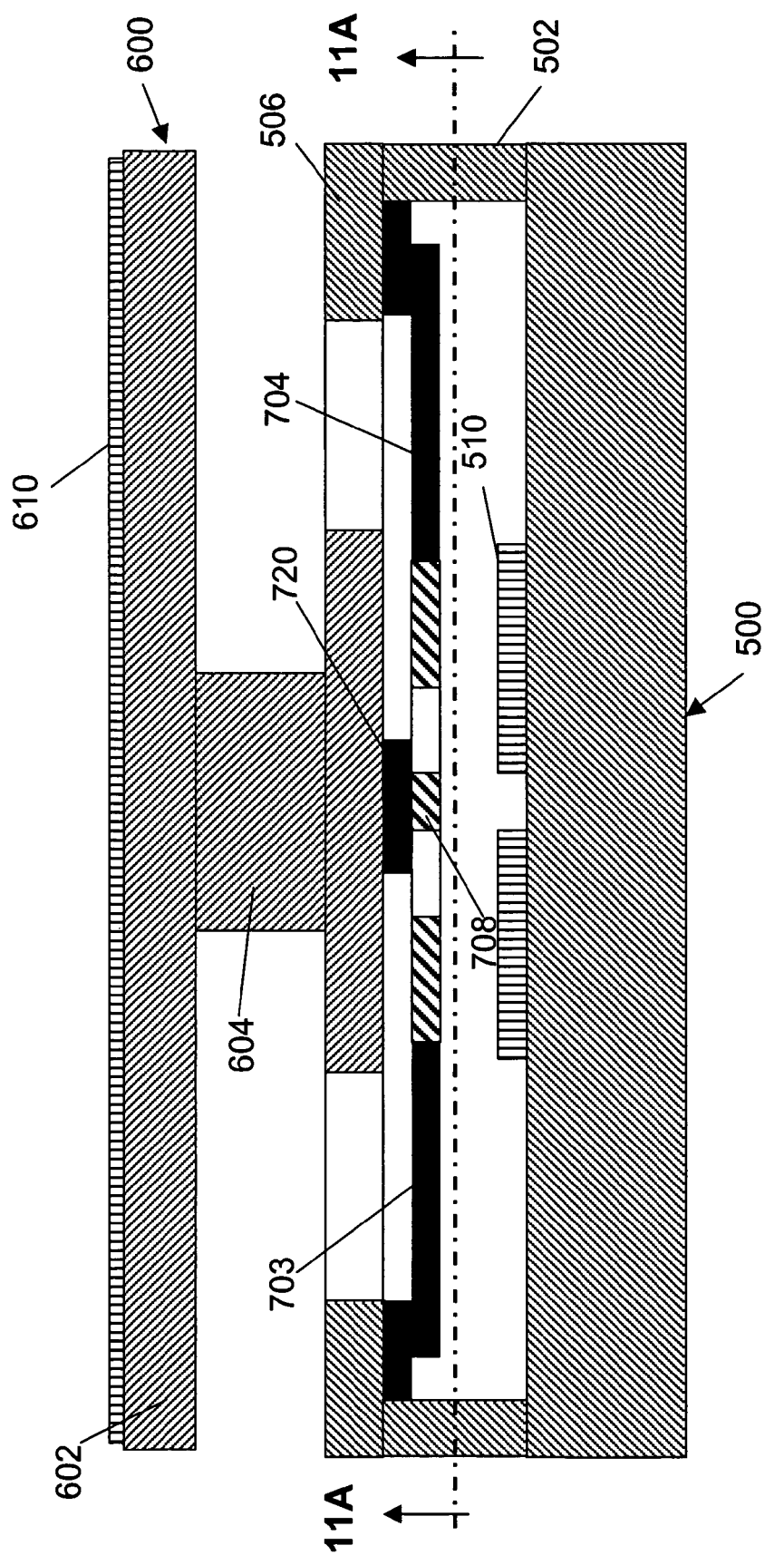
FIG. 11B is a cross-sectional side view of the bi-axial high fill factor MEMS apparatus of FIG. 11A taken along the lines 11B—11B.

FIGS. 11A–11B illustrate another embodiment of a bi-axial high fill factor MEMS apparatus which avoids the need for an intermediate gimbal as shown in the embodiment of FIGS. 10A–10B. As best illustrated in FIG. 11A, the two pairs of hinges and the gimbal of the previous embodiment may be replaced by a unitary bi-axial hinge structure 700 comprising a frame 702 having first hinge elements 703, 704 which couple the frame to the ridge 506 of the base support 500. This affords rotation about a horizontal or x-axis in FIGS. 11A–11B. In order to provide rotation about a second axis, the y-axis, the hinge structure 700 includes a hinge element 708 which extends across the center of the frame 702 and is connected at its ends to the frame, as shown in FIG. 11A. Hinge element 708 may be connected to and support at its center a hinge plate 720. As shown in FIG. 11B, hinge plate 720, in turn, may support a support layer 512 and a bulk element 600 of the type shown in FIG. 10A. Hinges 703 and 704 enable frame 702 to rotate about the x-axis, and hinge element 708 twists torsionally about its longitudinal axis to permit rotation about the y-axis to afford biaxial movement. It is desirable that the frame 702 be dimensioned so that it is relatively stiff as compared to hinge elements 703, 704 and 708 in order to minimize the cross-coupling between movements about the different axes. An advantage of the embodiment of FIGS. 11A–11B over the embodiment of FIGS. 10A–10B is that it is a somewhat simpler structure and avoids the necessity for a separate intermediate gimbal.

FIGS. 12A–12H illustrate a process which may be employed for fabricating a MEMS apparatus corresponding to the embodiment of FIG. 5B. It will be appreciated by those skilled in the art that similar processes may be employed for fabricating other embodiments of the invention.

Figure 12A:
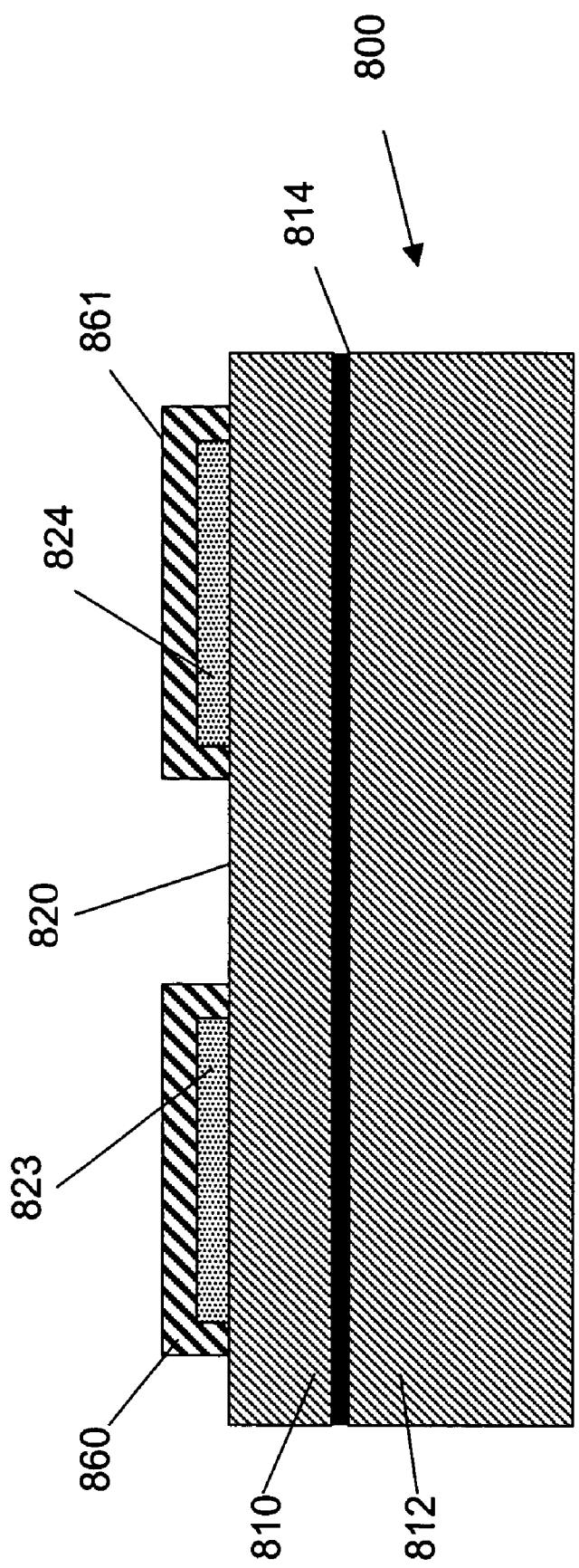
FIGS. 12A–H show an exemplary process for fabricating a high fill factor MEMS apparatus according to the invention.

FIG. 12A is a side view which illustrates an initial step of the fabrication process to form the support layer 110 and hinge elements 160–161 of the embodiment of FIG. 5B. As shown in FIG. 12A, a first SOI (Silicon On Insulator) wafer comprising a single-crystal silicon layer 810 and a silicon "handle wafer" 812 with a first insulation layer 814, e.g., silicon oxide, sandwiched between wafers 810 and 812 may be formed. The single-crystal silicon support layer 810 may have a thickness of the order of 5–100 µm, for example. First and second hinge elements 860, 861 may be fabricated on a first surface 820 of the single-crystal silicon support layer 810 in a known manner, e.g., by a known surface micromachining technique. Each hinge element may be a thin-film material, e.g., as of polysilicon, polyoxide, nitride, silicon nitride, silicon oxide, silicon oxynitride, or a metal. First and second sacrificial elements 823, 824, e.g., as of silicon oxide, may be first patterned on the first surface 820 prior to forming the first and second hinge elements 860, 861, respectively.

Figure 12B:
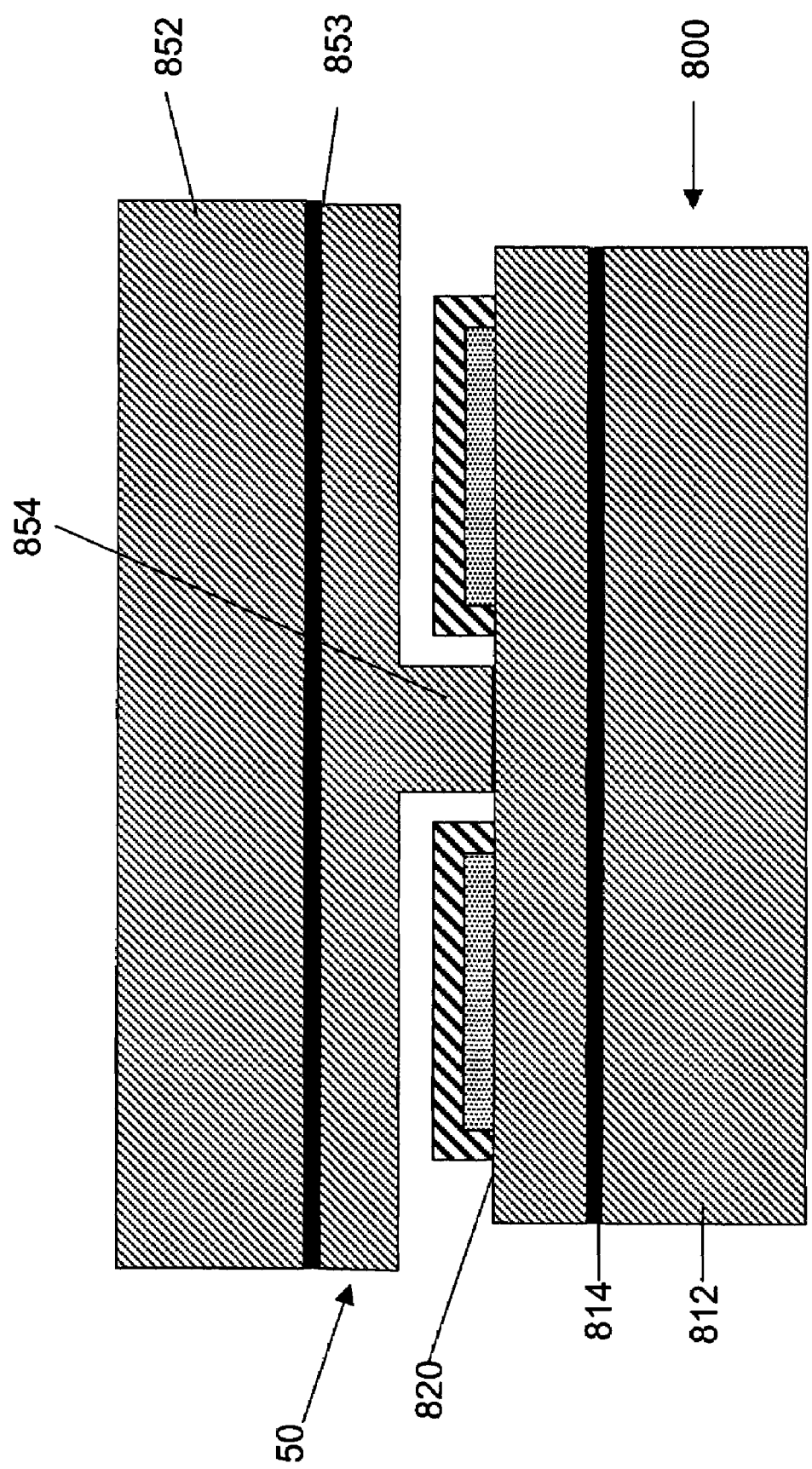

Next, referring to FIG. 12B, a bulk element corresponding to bulk element 150 of FIG. 5B may be separately formed by a second SOI wafer comprising a single-crystal silicon layer 850 and a silicon handle wafer 852 having an insulation layer 853 sandwiched therebetween. The second single-crystal silicon layer 850 may be etched to create a pedestal or post 854, and the pedestal 854 may be bonded to the support surface 820 of the first SOI wafer at a region disposed between the hinges 823, 824 as indicated in the figure. The handle wafer 812 and insulation layer 814 of first SOI wafer may then be removed, and the support layer 810 may be etched using known bulk micromachining techniques, such as deep reactive ion etching, to produce a continuous channel through the thickness of the support layer 810 (two channel portions 857, 858 of which are shown extending into the sacrificial layers 823, 824). Next the sacrificial layers are removed, as by etching, as shown in FIG. 12D. It will be recognized by those skilled in the art that the first and second sacrificial layers 823, 824 may also be removed earlier in the fabrication process at any point after the formation of hinge elements 860, 861. Additionally, the channel completely releases a central portion 870 of the support layer 810 from a surrounding outer portion 872 of the support layer (after removal of sacrificial layers 823, 824) so that the center portion 870 of the support layer is disconnected from the outer portions 872 except for the hinge elements 860, 861. As will become apparently shortly, outer portions 872 of the support layer will subsequently form the ridge 145 of the apparatus of FIG. 5B.

Figure 12C:
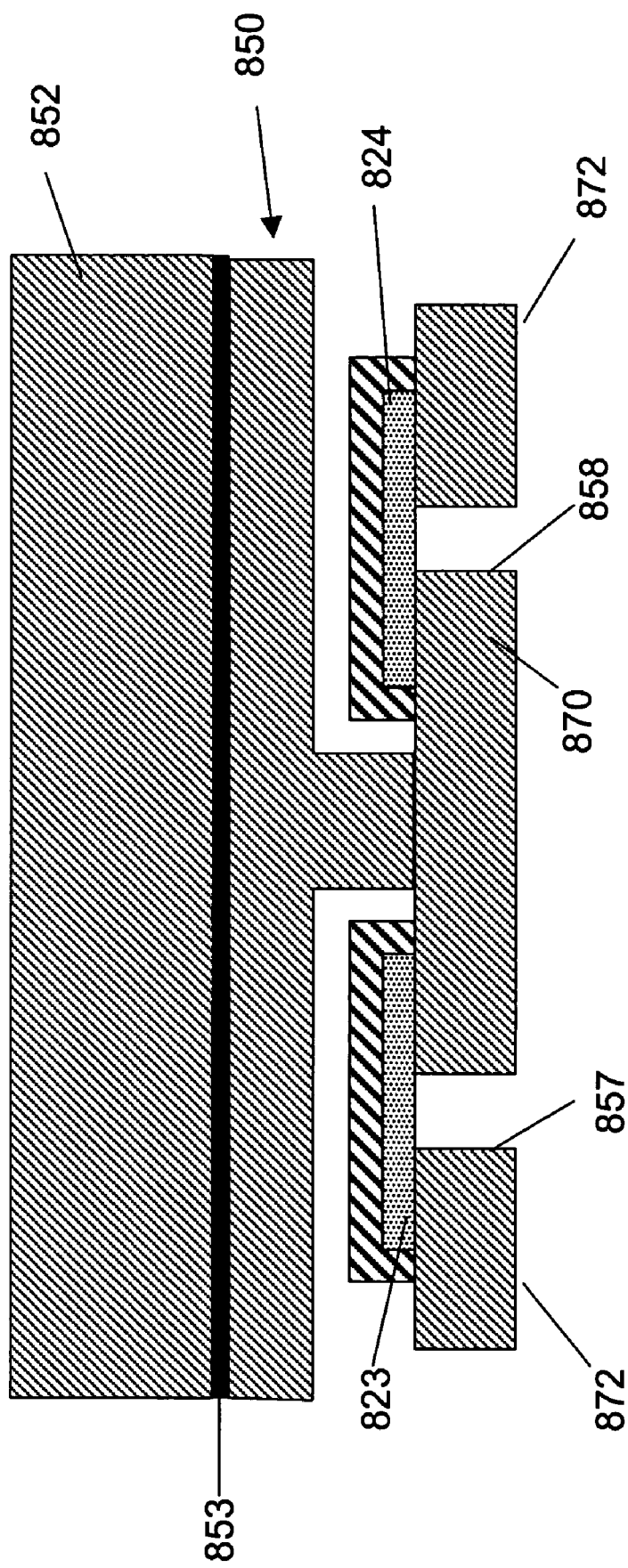
Figure 12D:
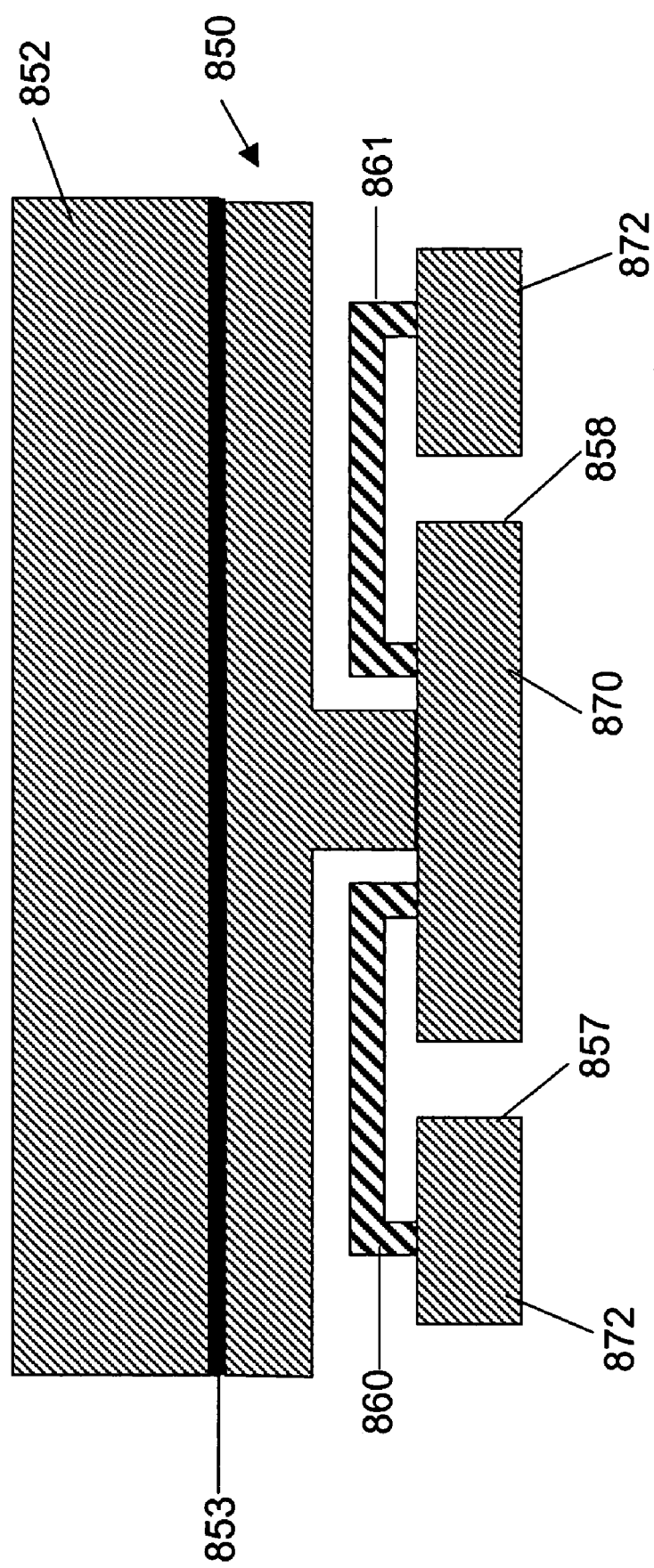
Figure 12E:
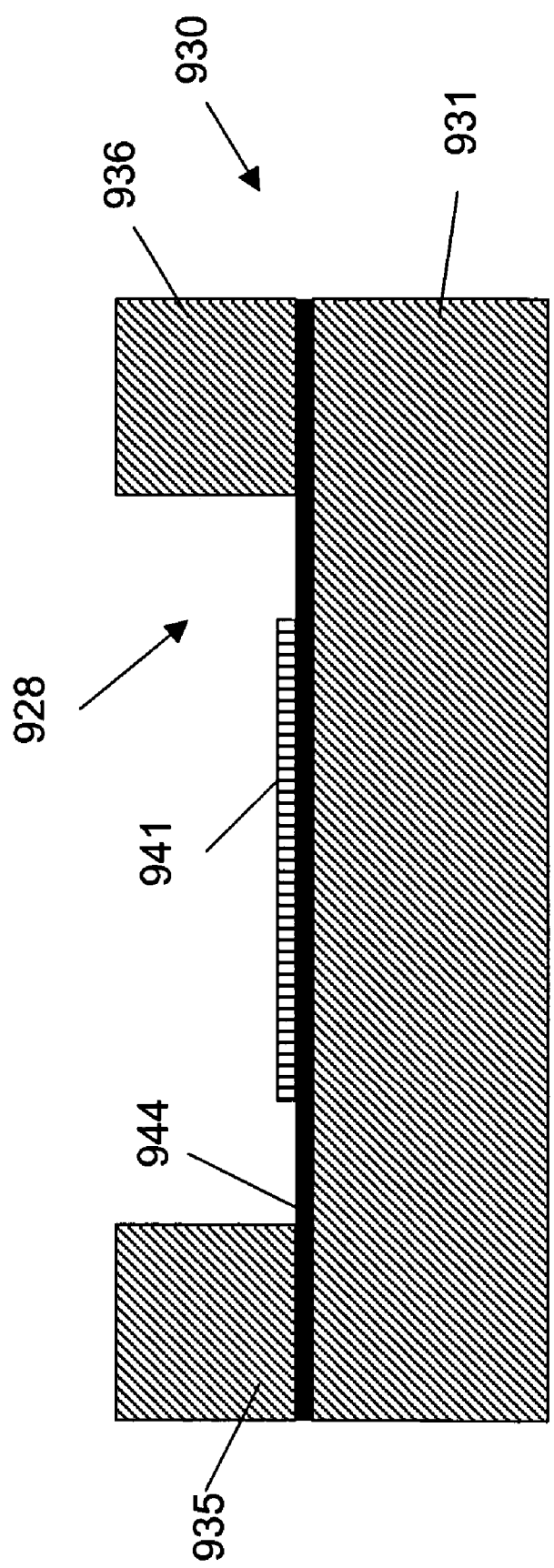

Next, referring to FIG. 12E, the base support 130 of the apparatus of FIG. 5B may be formed from an SOI or glass wafer as a substrate 931 having side walls 935, 936 to form a portion of a cavity 928 in the base support. One or more electrodes 941 may be deposited on a bottom surface 944 of the cavity, as shown in FIG. 12E.

Figure 12F:
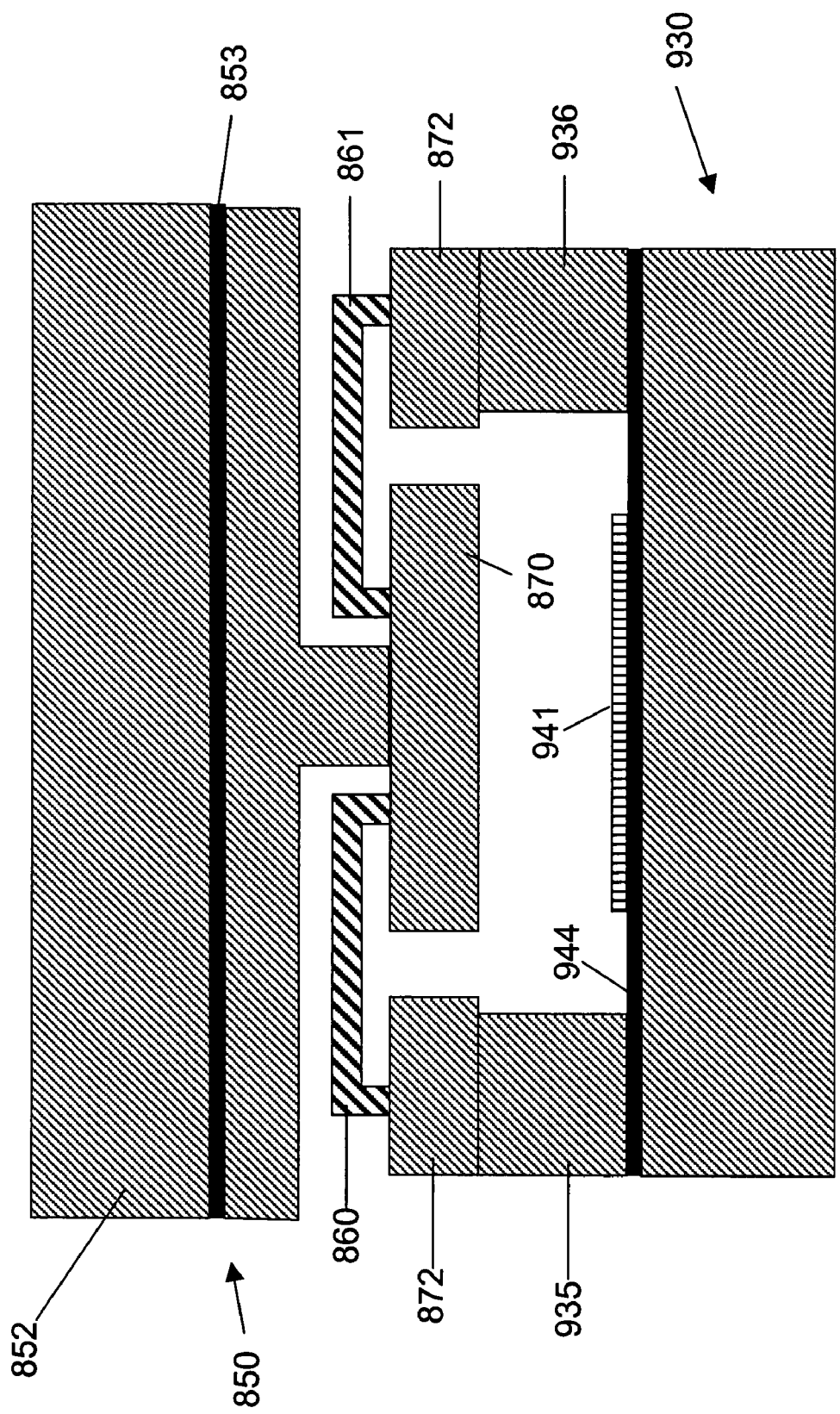
Figure 12G:
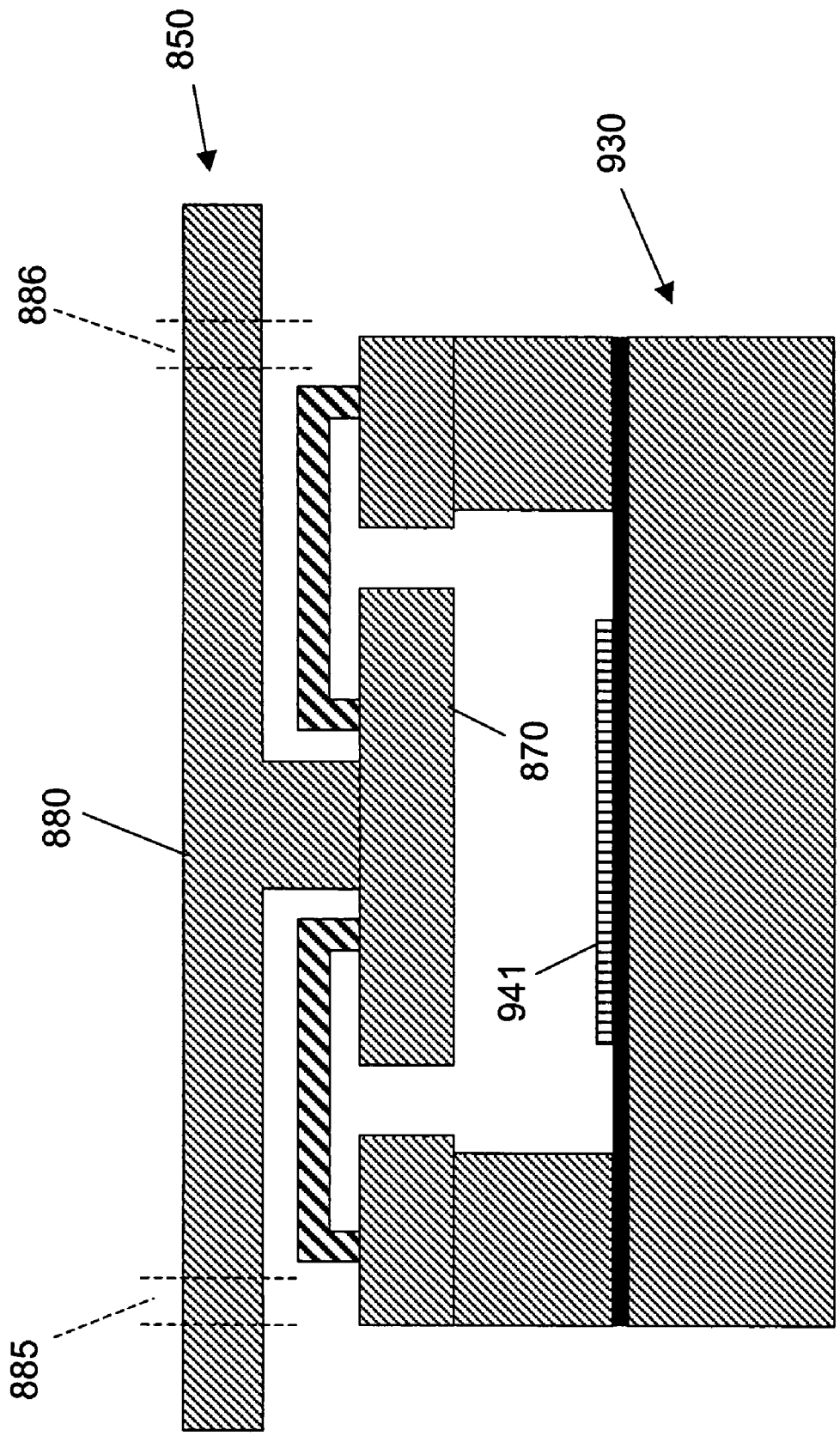
Figure 12H:
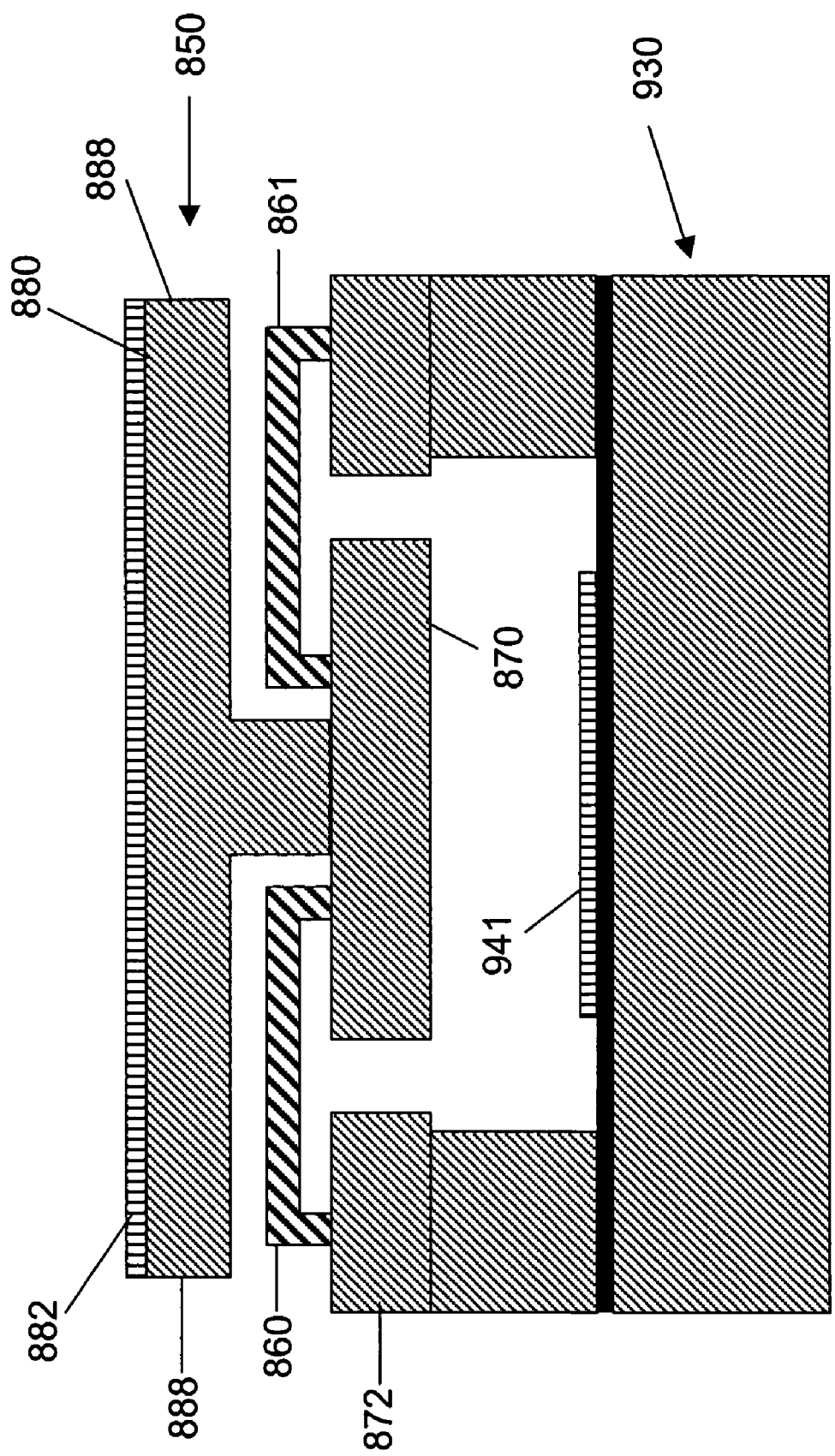

Next, the previously formed structure of FIG. 12C comprising the support layer 810 and the bulk element 850 may be bonded to the base support of FIG. 12E. As shown in FIG. 12F, the outer portions 872 may be bonded on top of sidewalls 935, 936 of the base support layer 930 as shown in FIG. 12F. The SOI wafer constituting the top layer 852 of the bulk element 850 and the insulation layer 853 may then be removed, leaving the top surface 880 of the bulk element substantially planar and producing the structure shown in FIG. 12G. Top surface 880 comprises the optical surface of the bulk element. Finally, as shown in FIG. 12G, trenches 885–886 may be etched in the device layer 850, as by using a bulk micromachining technique such as deep reactive ion etching, to size the device layer and optical surface to a desired size. The trenches form the sides 888 of the device layer, as shown in FIG. 12H. A reflective layer 882 may be deposited on the optical surface 880 of the device layer, as also indicated in FIG. 12H.

The reflective layer may comprise a material such as gold, aluminum, silver or copper, a gold film being preferred. The apparatus shown in FIG. 12H corresponds to the embodiment of FIG. 5B. It will be appreciated by those skilled in the art that other well known fabrication techniques may also be employed for fabricating this and other embodiments of MEMS apparatus in accordance with the invention.

Also, to fabricate a bi-axial structure such as illustrated in FIGS. 10A–10B, it will be appreciated that the foregoing process can be readily modified such that the support layer 810 may be etched to form a separate gimbal frame intermediate the edge portions 872 and the center portion 870. In this event, hinge elements 860, 861 may then couple the center portion 870 and the gimbal, and another set of hinges may be formed to connect the gimbal to the outer portions 872 which form the ridge of the base support.

An advantage of the MEMS apparatus of the invention is that by locating the hinge elements in a different plane from the optical or device surface, e.g., underneath the bulk element, the optical surface area of the bulk element can be maximized relative to the base and the optical surface area available for use, e.g., for optical beam manipulation, is increased. Such a feature would be highly advantageous in making arrayed MEMS devices, such as an array of MEMS mirrors with a high optical fill factor. Further, by advantageously making use of a combination of bulk and surface micromachining techniques, a MEMS mirror according to the present invention may be equipped with a large and flat mirror along with flexible hinges, thereby capable of providing a substantial rotational range at moderate electrostatic drive voltages. An additional advantage of the MEMS apparatus of the present invention is evident in its monolithic structure, rendering it robust in performance. These advantageous features are in notable contrast with the prior devices. As such, the present invention may be used in a variety of applications, e.g., providing arrayed MEMS mirrors (or beam steering devices) for optical networking applications.

Those skilled in the art will recognize that the foregoing embodiments are illustrative of the invention, and that various changes, substitutions, and alternations can be made in these embodiments without departing from the principles of the invention, the scope of which is defined by the appended claims.

What is claimed is:

1. Micro-Electromechanical Systems (MEMS) apparatus comprising a base support; a planar support layer having a support surface; a plurality of hinges for suspending said support layer relative to said base support for movement about two axes, the plurality of hinges being disposed in a different plane from said support layer; a bulk element comprising a device layer having an optical surface; and a pedestal that extends between the support surface and the device layer.

2. The apparatus of claim 1 wherein said pedestal is sized to support the device layer a predetermined distance from the support layer.

3. The apparatus of claim 2, wherein the pedestal is sized to position the device layer a sufficient distance from the support layer to afford a predetermined angular movement.

4. The apparatus of claim 1 further comprising an intermediate support element disposed between the base support and the support layer, and wherein the plurality of hinges comprises first hinge elements suspending the support layer relative to the intermediate support element, and second hinge elements suspending the intermediate support element relative to the base support.

5. The apparatus of claim 4, wherein the intermediate support element comprises a gimbal.

6. The apparatus of claim 1 further comprising a frame, and wherein the plurality of hinges includes first hinge elements that suspend the frame relative to the base support for movement about a first axis and a second hinge element that suspends the support layer relative to the frame for movement about a second axis.

7. The apparatus of claim 6, wherein the second hinge element is connected to opposite sides of the frame and is disposed within an opening in the frame.

8. The apparatus of claim 6 further comprising a support plate connected to the second hinge and to the support layer.

9. The apparatus of claim 6, wherein the frame comprises a unitary structure formed of thin-film material.

10. The apparatus of claim 6, wherein the frame is dimensioned to be stiff relative to the first and second hinge elements.

11. The apparatus of claim 1 further comprising actuators disposed within a cavity in the base support for causing the support layer to move about said two axes.

* * * * *